United States Patent
Kumari et al.

(10) Patent No.: US 12,063,638 B2
(45) Date of Patent: Aug. 13, 2024

(54) TECHNIQUES FOR MULTI-BAND JOINT COMMUNICATIONS AND RADAR

(71) Applicant: QUALCOMM Incorporated, San Diego, CA (US)

(72) Inventors: Preeti Kumari, San Diego, CA (US); Kapil Gulati, Belle Mead, NJ (US); Junyi Li, Fairless Hills, PA (US); Gene Wesley Marsh, San Diego, CA (US); Shailesh Patil, San Diego, CA (US); Sony Akkarakaran, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 424 days.

(21) Appl. No.: 17/552,378

(22) Filed: Dec. 16, 2021

(65) Prior Publication Data
US 2023/0199741 A1  Jun. 22, 2023

(51) Int. Cl.
*H04W 72/044* (2023.01)
*G01S 7/00* (2006.01)
*H04W 8/24* (2009.01)
*H04W 24/10* (2009.01)

(52) U.S. Cl.
CPC .......... *H04W 72/046* (2013.01); *G01S 7/006* (2013.01); *H04W 8/24* (2013.01); *H04W 24/10* (2013.01)

(58) Field of Classification Search
CPC ..... H04W 72/046; H04W 8/24; H04W 24/10; H04W 72/51; G01S 7/006; G01S 2013/9316; G01S 7/0232; G01S 7/0234
USPC ........................................................ 455/451
See application file for complete search history.

(56) References Cited

U.S. PATENT DOCUMENTS

2020/0036487 A1* 1/2020 Hammond ............ H04L 5/0012
2023/0086144 A1* 3/2023 Roy ........................ H04L 5/005

FOREIGN PATENT DOCUMENTS

WO   WO-2023014275 A1 * 2/2023

\* cited by examiner

*Primary Examiner* — Don N Vo
(74) *Attorney, Agent, or Firm* — Dalei Dong; Holland & Hart LLP

(57) ABSTRACT

Methods, systems, and devices for wireless communications are described. For example, a wireless device may support multi-band joint communication and radar (JCR) techniques. In some cases, a first wireless device may transmit, to a second wireless device, a capability message indicating whether a set of bands supports JCR operations. The second wireless device may transmit control signaling, based on the capability message, indicating a set of parameters for JCR operations including resources allocated for JCR operations. The first wireless device may transmit a JCR signal based on the control signaling via the allocated resources. For example, the first wireless device may transmit the signal for both communications and radar sensing in accordance with the set of parameters via the allocated resources.

30 Claims, 16 Drawing Sheets

TECHNIQUES FOR MULTI-BAND JOINT COMMUNICATIONS AND RADAR

FIELD OF TECHNOLOGY

The following relates to wireless communications, including techniques for multi-band joint communications and radar.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some systems, a wireless device may support single-band joint communications and radar (JCR) operations. In some such systems, the wireless device may support a relatively small radar range of operation and a wide field of view. Alternatively, the wireless device may support a narrow field of view for a relatively large radar range of operation. In any case, conventional techniques may result in poor radar range estimation at long target distances, multi-radar interference (for example, due to limited resources available in a single band), as well as relatively high power consumption at a higher band.

SUMMARY

The described techniques relate to improved methods, systems, devices, and apparatuses that support techniques for multi-band joint communications and radar (JCR). For example, a first wireless device (e.g., a user equipment) may transmit, to a second wireless device (e.g., a base station, a roadside unit, another user equipment, and the like), a capability message indicating whether a set of bands are associated with JCR operations. In some examples, the capability message may indicate a first subset of the set of bands which support JCR operations and a second subset of the set of bands which fail to support JCR operations. The JCR operations may include signaling for both radar sensing and communications in the wireless communications system. The second wireless device may transmit, to the first wireless device and based on the capability message, control signaling indicating a set of parameters for such JCR operations. For example, the second wireless device may indicate a resource allocation for JCR signaling to the first wireless device. The first wireless device may transmit a JCR signal via the allocated resources to a third wireless device based on the control signaling. For example, the first wireless device may transmit a signal for both radar sensing and communications in accordance with the set of parameters indicated by the control signaling.

A method for wireless communications at a user equipment (UE) is described. The method may include transmitting, to a wireless node, a capability message indicating whether a set of bands are associated with joint communications and radar operations, the joint communications and radar operations including signaling for both radar sensing and communications, receiving, from the wireless node and based on the capability message, a control message indicating a set of parameters for the joint communications and radar operations, the set of parameters including resources allocated for the joint communications and radar operations, and transmitting, via the resources, a signal for both radar sensing and communications in accordance with the set of parameters.

An apparatus for wireless communications at a UE is described. The apparatus may include a processor, memory coupled with the processor, and instructions stored in the memory. The instructions may be executable by the processor to cause the apparatus to transmit, to a wireless node, a capability message indicating whether a set of bands are associated with joint communications and radar operations, the joint communications and radar operations including signaling for both radar sensing and communications, receive, from the wireless node and based on the capability message, a control message indicating a set of parameters for the joint communications and radar operations, the set of parameters including resources allocated for the joint communications and radar operations, and transmit, via the resources, a signal for both radar sensing and communications in accordance with the set of parameters.

Another apparatus for wireless communications at a UE is described. The apparatus may include means for transmitting, to a wireless node, a capability message indicating whether a set of bands are associated with joint communications and radar operations, the joint communications and radar operations including signaling for both radar sensing and communications, means for receiving, from the wireless node and based on the capability message, a control message indicating a set of parameters for the joint communications and radar operations, the set of parameters including resources allocated for the joint communications and radar operations, and means for transmitting, via the resources, a signal for both radar sensing and communications in accordance with the set of parameters.

A non-transitory computer-readable medium storing code for wireless communications at a UE is described. The code may include instructions executable by a processor to transmit, to a wireless node, a capability message indicating whether a set of bands are associated with joint communications and radar operations, the joint communications and radar operations including signaling for both radar sensing and communications, receive, from the wireless node and based on the capability message, a control message indicating a set of parameters for the joint communications and radar operations, the set of parameters including resources allocated for the joint communications and radar operations, and transmit, via the resources, a signal for both radar sensing and communications in accordance with the set of parameters.

In some examples of the method, apparatuses, and non-transitory computer-readable medium described herein, transmitting the capability message may include operations, features, means, or instructions for transmitting an indication that a first subset of the set of bands supports the joint communications and radar operations, an indication that a second subset of the set of bands fails to support the joint communications and radar operations, or both.

In some examples of the method, apparatuses, and non-transitory computer-readable medium described herein, transmitting the capability message may include operations, features, means, or instructions for transmitting an indication of a set of codebook parameters for one or more bands of the set of bands that support the joint communications and radar operations, the set of codebook parameters including one or more sub-carrier spacing configurations, beamforming parameters, a radar reference signal configuration, or any combination thereof.

In some examples of the method, apparatuses, and non-transitory computer-readable medium described herein, transmitting the capability message may include operations, features, means, or instructions for transmitting a performance report for communications via one or more bands of the set of bands based on the set of parameters.

In some examples of the method, apparatuses, and non-transitory computer-readable medium described herein, the performance report indicates a throughput, a latency, a signal to noise ratio, a signal to interference ratio, or any combination thereof.

In some examples of the method, apparatuses, and non-transitory computer-readable medium described herein, transmitting the capability message may include operations, features, means, or instructions for transmitting a performance report for radar via one or more bands of the set of bands based on the set of parameters.

In some examples of the method, apparatuses, and non-transitory computer-readable medium described herein, the performance report indicates a threshold range, a threshold velocity, a threshold angular estimate, a target estimation accuracy, an interference metric, or any combination thereof.

In some examples of the method, apparatuses, and non-transitory computer-readable medium described herein, the set of parameters includes a configuration for waveform beamforming transmissions for the joint communications and radar operations based on the capability message.

In some examples of the method, apparatuses, and non-transitory computer-readable medium described herein, transmitting the signal for both radar sensing and communications may include operations, features, means, or instructions for transmitting a first stage signal for radar sensing, the first stage signal associated with a first set of metrics based on the set of parameters and transmitting a second stage signal for the radar sensing, the second stage signal associated with a second set of metrics based on the set of parameters.

In some examples of the method, apparatuses, and non-transitory computer-readable medium described herein, the first set of metrics includes a first communications data rate and the second set of metrics includes a second communications data rate greater than the first communications data rate.

In some examples of the method, apparatuses, and non-transitory computer-readable medium described herein, receiving the control message may include operations, features, means, or instructions for receiving, based on a radar interference of a first angular sector of a band satisfying a threshold, an indication allocating narrow band communications in a second angular sector of the band, an indication to use a tracking radar mode in the second angular sector of the band, or any combination thereof.

In some examples of the method, apparatuses, and non-transitory computer-readable medium described herein, transmitting the signal for both radar sensing and communications may include operations, features, means, or instructions for transmitting, to a second UE, a first signal via a first band based on a capability of the second UE and transmitting a second signal via a second band based on the capability of the second UE.

Some examples of the method, apparatuses, and non-transitory computer-readable medium described herein may further include operations, features, means, or instructions for transmitting the first signal via the first band with a communications data rate that satisfies a threshold based at least in part the second UE supporting the first band for communications.

Some examples of the method, apparatuses, and non-transitory computer-readable medium described herein may further include operations, features, means, or instructions for transmitting the first signal for radar sensing via the first band and transmitting the second signal for data communications via the second band based on the second band supporting radar sensing in a full duplex mode.

Some examples of the method, apparatuses, and non-transitory computer-readable medium described herein may further include operations, features, means, or instructions for transmitting, to the wireless node, a second capability message indicating one or more metrics associated with transmitting the signal for both radar sensing and communications and receiving, from the wireless node and based on the second capability message, a second control message indicating a second set of parameters.

A method for wireless communications at a wireless node is described. The method may include receiving, from a UE, a capability message indicating whether a set of bands are associated with joint communications and radar operations, the joint communications and radar operations including signaling for both radar sensing and communications, transmitting, to the UE and based on the capability message, a control message indicating a set of parameters for the joint communications and radar operations, the set of parameters including resources allocated for the joint communications and radar operations, and receiving, via the resources, a second capability message associated with the joint communications and radar operations based on the set of parameters.

An apparatus for wireless communications at a wireless node is described. The apparatus may include a processor, memory coupled with the processor, and instructions stored in the memory. The instructions may be executable by the processor to cause the apparatus to receive, from a UE, a capability message indicating whether a set of bands are associated with joint communications and radar operations, the joint communications and radar operations including signaling for both radar sensing and communications, transmit, to the UE and based on the capability message, a control message indicating a set of parameters for the joint communications and radar operations, the set of parameters including resources allocated for the joint communications and radar operations, and receive, via the resources, a second capability message associated with the joint communications and radar operations based on the set of parameters.

Another apparatus for wireless communications at a wireless node is described. The apparatus may include means for receiving, from a UE, a capability message indicating whether a set of bands are associated with joint communications and radar operations, the joint communications and radar operations including signaling for both radar sensing and communications, means for transmitting, to the UE and based on the capability message, a control message indicating a set of parameters for the joint communications and radar operations, the set of parameters including resources allocated for the joint communications and radar operations, and means for receiving, via the resources, a second capability message associated with the joint communications and radar operations based on the set of parameters.

A non-transitory computer-readable medium storing code for wireless communications at a wireless node is described. The code may include instructions executable by a processor to receive, from a UE, a capability message indicating whether a set of bands are associated with joint communications and radar operations, the joint communications and radar operations including signaling for both radar sensing and communications, transmit, to the UE and based on the capability message, a control message indicating a set of parameters for the joint communications and radar operations, the set of parameters including resources allocated for the joint communications and radar operations, and receive, via the resources, a second capability message associated with the joint communications and radar operations based on the set of parameters.

In some examples of the method, apparatuses, and non-transitory computer-readable medium described herein, receiving the capability message may include operations, features, means, or instructions for receiving an indication that a first subset of the set of bands supports the joint communications and radar operations, an indication that a second subset of the set of bands fails to support the joint communications and radar operations, or both.

In some examples of the method, apparatuses, and non-transitory computer-readable medium described herein, receiving the capability message may include operations, features, means, or instructions for receiving an indication of a set of codebook parameters for one or more bands of the set of bands that support the joint communications and radar operations, the set of codebook parameters including one or more sub-carrier spacing configurations, beamforming parameters, a radar reference signal configuration, or any combination thereof.

In some examples of the method, apparatuses, and non-transitory computer-readable medium described herein, receiving the capability message may include operations, features, means, or instructions for receiving a performance report for communications via one or more bands of the set of bands based on the set of parameters.

In some examples of the method, apparatuses, and non-transitory computer-readable medium described herein, the performance report indicates a throughput, a latency, a signal to noise ratio, a signal to interference ratio, or any combination thereof.

In some examples of the method, apparatuses, and non-transitory computer-readable medium described herein, receiving the capability message may include operations, features, means, or instructions for receiving a performance report for radar via one or more bands of the set of bands based on the set of parameters.

In some examples of the method, apparatuses, and non-transitory computer-readable medium described herein, the performance report indicates a threshold range, a threshold velocity, a threshold angular estimate, a target estimation accuracy, an interference metric, or any combination thereof.

In some examples of the method, apparatuses, and non-transitory computer-readable medium described herein, the set of parameters includes a configuration for waveform beamforming transmissions for the joint communications and radar operations based on the capability message.

Some examples of the method, apparatuses, and non-transitory computer-readable medium described herein may further include operations, features, means, or instructions for determining the set of parameters based on the set of parameters satisfying one or more thresholds, the one or more thresholds including thresholds of the capability message, radar and communications thresholds, priority thresholds, interference thresholds, a capability of a receiver UE, or any combination thereof.

In some examples of the method, apparatuses, and non-transitory computer-readable medium described herein, the set of parameters includes a first set of parameters for a first stage signal and a second set of parameters for a second stage signal.

In some examples of the method, apparatuses, and non-transitory computer-readable medium described herein, transmitting the control message may include operations, features, means, or instructions for transmitting, based on a radar interference of a first angular sector of a band satisfying a threshold, an indication allocating narrow band communications in a second angular sector of the band, an indication to use a tracking radar mode in the second angular sector of the band, or any combination thereof.

Some examples of the method, apparatuses, and non-transitory computer-readable medium described herein may further include operations, features, means, or instructions for transmitting, to the UE and based on the second capability message, a second control message indicating a second set of parameters.

DETAILED DESCRIPTION

Figure 1:
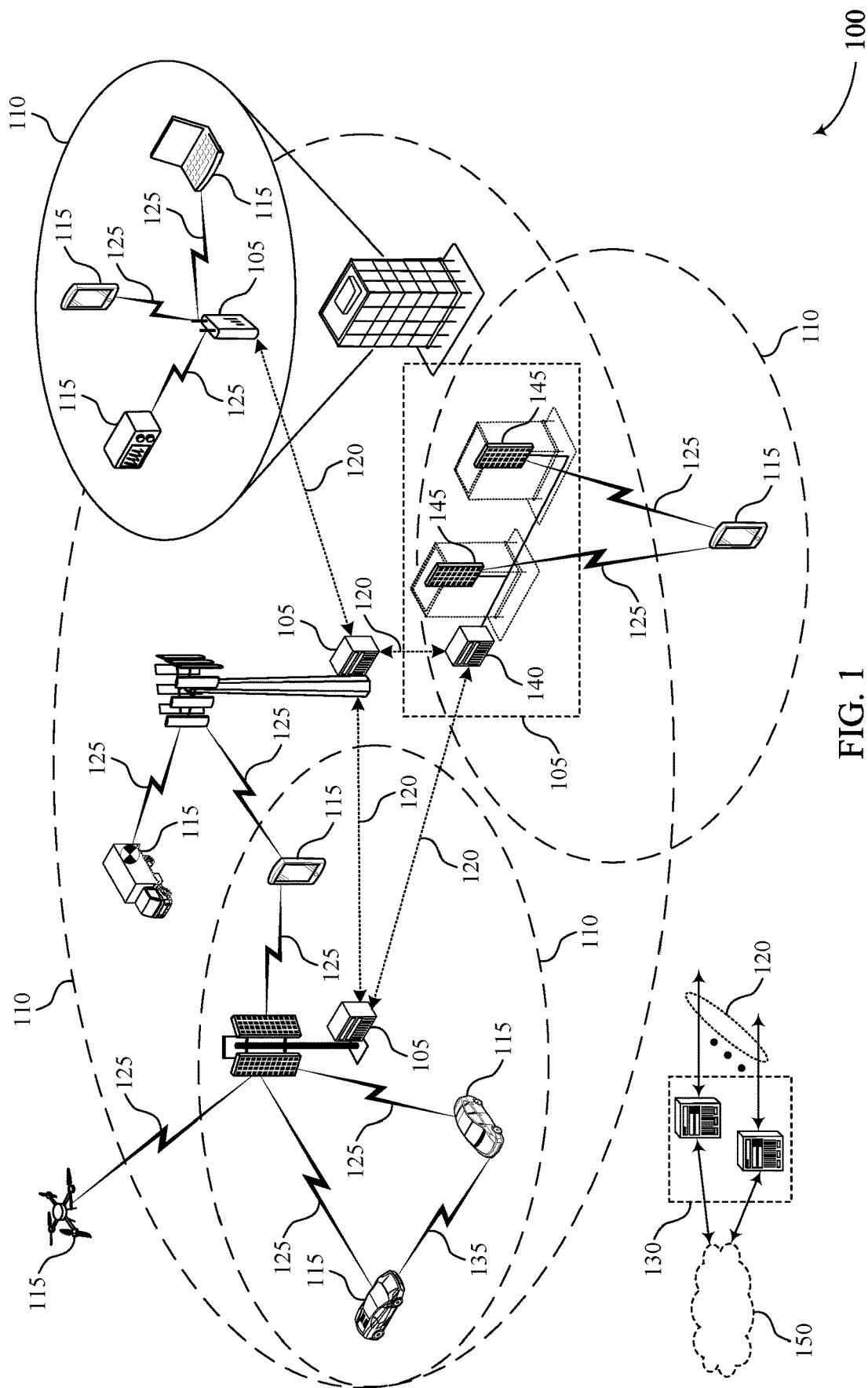
FIG. 1 illustrates an example of a wireless communications system that supports techniques for multi-band joint communications and radar in accordance with various aspects of the present disclosure.

Some wireless communications systems may support joint communication and radar (JCR). For example, a wireless device such as a user equipment (UE) may transmit signaling for both communications and radar. That is, devices may support co-designed communication and radar systems where a common transmitter or receiver may be used for both communication and radar functionalities. In some examples, such JCR operations may include radar-centric JCR, where radar signaling may also be used for communications (e.g., communication messages may be modulated on top of radar waveforms, such as phase coded frequency-modulated continuous wave (FMCW) radar). Additionally or alternatively, the JCR operations may include communication-centric JCR, where communication waveforms (e.g., orthogonal frequency division multiplexing (OFDM) or division multiple access (CDMA)) may also be used for radar sensing. In some cases, devices may support single-band communication-centric radar sending (e.g., communication signals used for radar sensing on a single band, such as 73 GHz band). However, in some such cases the device may experience a relatively small radar range of operation for a wide field of view. Alternatively, the device may experience a narrow field of view for a relatively large radar range of operation. Additionally or alternatively, such single-band communication-centric radar sensing may result in multi-radar interference, for example, due to limited resources available in a single band, as well as relatively high power consumption at higher frequency bands.

Accordingly, the techniques described herein may support multi-band joint communications and radar. Generally, the described techniques may enable devices to jointly communicate and perform radar sensing over multiple bands, which may improve frequency diversity, result in improved radar range and field of view, realize reduced interference, and increase communication reliability or throughput, among other potential advantages. In some examples, a wireless device (e.g., a UE) may transmit a capability message to a wireless node (e.g., a controller node such as a base station, an RSU, another UE, and the like). The capability message may indicate one or more parameters associated with a capability to support JCR operations (e.g., a capability to transmit or receive signaling for both communication and radar sensing functionalities).

For example, the capability message may indicate whether a set of bands supports JCR signaling (e.g., the capability message may indicate bands which support JCR operations, bands which fail to support such JCR operations, or both). In some cases, the one or more parameters of the capability message may include a set of codebook parameters (e.g., JCR waveform-beamforming codebook specifications). The set of codebook parameters may correspond to one or more multi-band configurations (e.g., the capability message may indicate a respective set of codebook parameters for each respective multi-band configuration that supports communication-centric full duplex radar operations in at least one band of the multiple bands). In some examples, the capability message may include one or more performance reports (e.g., one or more expected or threshold communication parameters, radar parameters, or both).

The wireless node may receive the capability message and transmit control signaling configuring the wireless device with one or more parameters for JCR operations. For example, the wireless node may transmit a control message indicating a resource allocation for JCR signaling, one or more transmit parameters or specifications for the JCR signaling, or a combination thereof. In some examples, the one or more parameters indicated by the control message may be based on the capability message (e.g., the one or more parameters for the JCR operations may satisfy one or more thresholds or specifications indicated in the capability message). The wireless device may transmit, to another wireless device (e.g., a second UE), a multi-band JCR signal using the parameters and resources indicated by the control message and/or the parameters indicated by the capability message.

Aspects of the disclosure are initially described in the context of wireless communications systems. Aspects of the disclosure are then described in the context of JCR systems and process flows. Aspects of the disclosure are further illustrated by and described with reference to apparatus diagrams, system diagrams, and flowcharts that relate to techniques for multi-band joint communications and radar.

FIG. 1 illustrates an example of a wireless communications system 100 that supports techniques for multi-band joint communications and radar in accordance with various aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

In some examples, one or more components of the wireless communications system 100 may operate as or be referred to as a network node. As used herein, a network node may refer to any UE 115, base station 105, entity of a core network 130, apparatus, device, or computing system configured to perform any techniques described herein. For example, a network node may be a UE 115. As another example, a network node may be a base station 105. As another example, a first network node may be configured to communicate with a second network node or a third network node. In one aspect of this example, the first network node may be a UE 115, the second network node may be a base station 105, and the third network node may be a UE 115. In another aspect of this example, the first network node may be a UE 115, the second network node may be a base station 105, and the third network node may be a base station 105. In yet other aspects of this example, the first, second, and third network nodes may be different. Similarly, reference to a UE 115, a base station 105, an apparatus, a device, or a computing system may include disclosure of the UE 115, base station 105, apparatus, device, or computing system being a network node. For example, disclosure that a UE 115 is configured to receive information from a base station 105 also discloses that a first network node is configured to receive information from a second network node. In this example, consistent with this disclosure, the first network node may refer to a first UE 115, a first base station 105, a first apparatus, a first device, or a first computing system configured to receive the information; and the second network node may refer to a second UE 115, a second base station 105, a second apparatus, a second device, or a second computing system.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IOT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at some orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may support techniques for multi-band JCR as described herein. For example, various devices (e.g., UEs 115, base stations 105, etc.) may communicate or otherwise be configured with capability information associated with support of JCR operations. For example, a first wireless device may transmit, to a second device, a capability message indicating a first subset of a set of bands which support JCR operations, a second subset of a set of bands which fail to support JCR operations, or both. The second device may determine a set of parameters for JCR operations (e.g., resources allocated for JCR operations), and may transmit the set of parameters in a control message to the first wireless device. The second wireless device may transmit a JCR signal to a third wireless device or the first wireless device based on the set of parameters. For example, the second wireless device may transmit a signal for both communications and radar sensing using the set of parameters indicated in the control message, one or more parameters of the capabilities of the various devices, or a combination thereof. Such techniques may result in enhanced frequency diversity, reduced radio frequency (RF) interference, improved detection of low radar cross section (RCS) objects, support for vehicular communications at high bands (e.g., mmWave vehicular communications), or any combination thereof, among other potential benefits. Additionally or alternatively, multi-band JCR operations may enable a low-latency radar search mode with reduced power consumption and coarse target parameter estimation accuracy, for example, due to a longer range and a wider field of view at lower bands.

Figure 2:
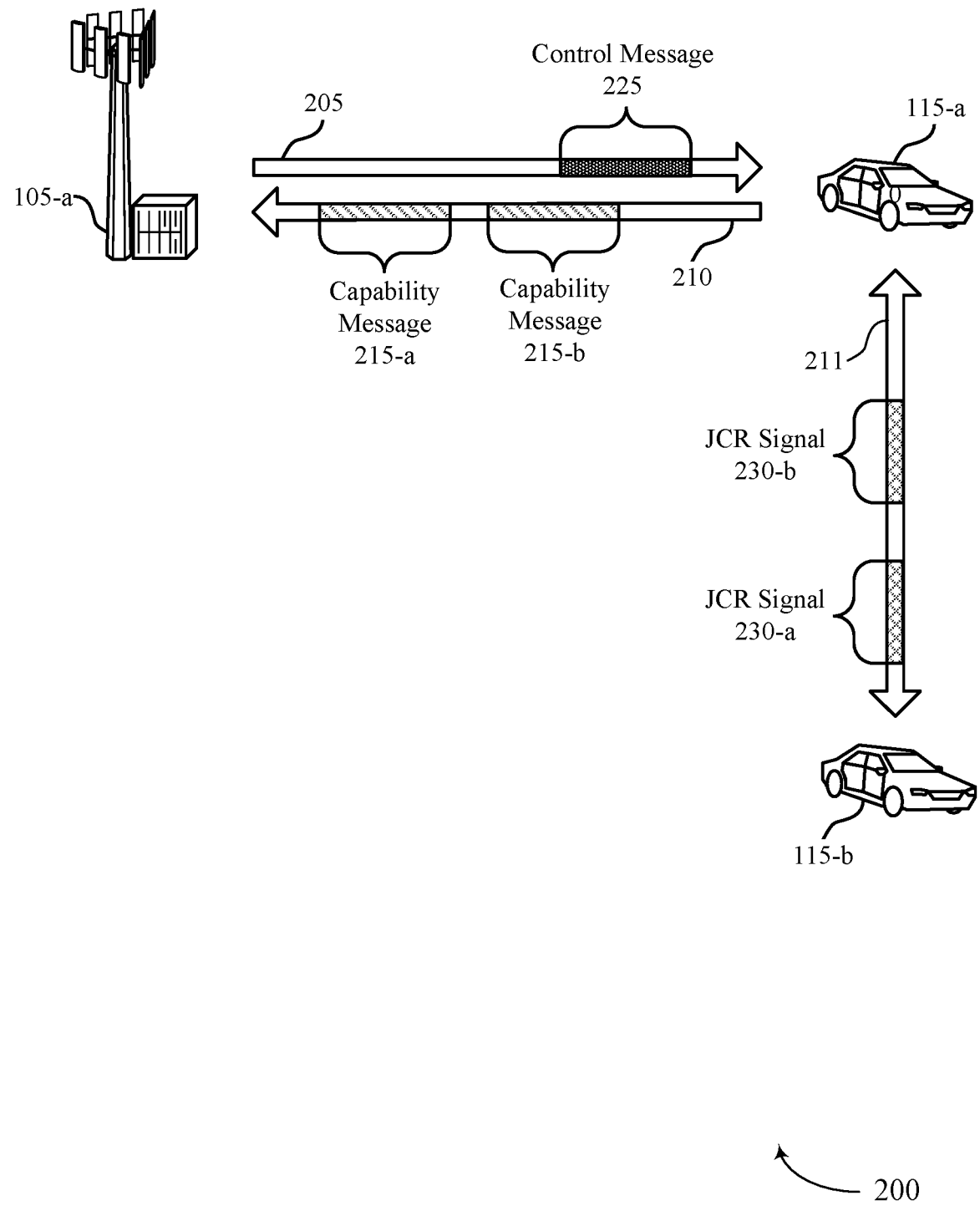
FIG. 2 illustrates an example of a wireless communications system that supports techniques for multi-band joint communications and radar in accordance with various aspects of the present disclosure.

FIG. 2 illustrates an example of a wireless communications system 200 that supports techniques for multi-band joint communications and radar in accordance with various aspects of the present disclosure. In some examples, wireless communications system 200 may implement aspects of wireless communications system 100 and may include a UE 115-*a*, a UE 115-*b*, and a base station 105-*a*, which may be examples of UEs 115 and a base station 105 and may communicate with one another as described above with reference to FIG. 1.

Although described as communications between UEs 115 and the base station 105-*a*, any type or quantity of devices may implement the techniques described herein (e.g., multiple UEs 115, IoT devices, roadside units (RSUs), base stations 105, centralized controller nodes, or any combination thereof, among other examples of wireless devices). For example, the base station 105-*a* may be an example of a wireless node (e.g., a centralized controller node) and the operations and signaling described herein may additionally or alternatively be performed by a RSU, a UE 115 (e.g., a group leader UE 115 of a group of UEs 115), and the like. Further, though the wireless communications system 200 depicts a V2X system with communications between vehicles and the base station 105-*a*, the techniques described herein may be implemented by any type or quantity of devices of any wireless communications system.

The base station 105-*a* may transmit downlink communications 205 to the UE 115-*a* via a communication link as described with reference to FIG. 1. The UE 115-*a* may transmit uplink communications 210 to the base station 105-*a* via a respective communication link. The UE 115-*a* and the UE 115-*b* may transmit or receive sidelink communications 211 via a respective communication link as described with reference to FIG. 1.

The wireless communications system 200 may support radar detection techniques (e.g., millimeter-wave radars used in vehicles). For example, the UE 115-*a* (e.g., a vehicle) may include a hardware component (e.g., a radar hardware component) that supports single-band operations (e.g., 76-81 GHz band). The UE 115-*a* may transmit a radar signal to sense the environment. For example, the signal may be reflected by surrounding objects and UE 115-*a* may receive echoes from the signal at the radar receiver, for example, in full-duplex configuration (e.g., the UE 115-*a* may transmit the radar signal and receive the radar signal concurrently). The UE 115-*a* may process the received signal to estimate the range, velocity, and angle parameters of the surrounding objects. In some cases (e.g., automotive applications in a vehicular environment), the UEs 115 may be configured with radar key performance indicator (KPI) thresholds. For example, the KPI thresholds may include resolution and estimation accuracy, maximum and minimum range and Doppler shift, field of view, update rate, and interference KPI metrics such as signal to interference noise ratio (SINR).

As an illustrative example, radar receivers at the UE 115-*a* may transmit signals and receive signal echoes from the surrounding UE 115-*b* (e.g., the signals may reflect off the UE 115-*b* back to the receiver of the UE 115-*a*). The UE 115-*a* may estimate channel parameters based on the echoes (e.g., the UE 115-*a* may estimate two-way monostatic channel parameters at a relatively high update rate, such as an update rate that satisfies a KPI threshold). The UE 115-*a* may process the estimated channel to characterize the location state of the UE 115-*b*. The location estimation accuracy may be relatively high due to a relatively wide available bandwidth, use of large antenna rays, or both. However, the radar may suffer from poor data association and may have limited sensing capabilities in some scenarios (e.g., blockage scenarios).

In some examples, the UEs 115 may support JCR. JCR systems may support co-located and cooperative radar and communication systems or co-design of communication and radar systems, as described with reference to FIG. 3. Further, co-design JCR may be communication-centric JCR where the communication waveforms (e.g., orthogonal frequency division multiplexing (OFDM) or code division multiple access (CDMA)) are exploited for radar sensing, or radar-centric JCR where the communication messages are modulated on top of the radar waveforms (e.g., phase-coded frequency modulated continuous wave (FMCW) radar waveforms).

As described herein, JCR operations may be referred to as operations or communications that support both communications and radar sensing capabilities. For example, the UE 115-*a* may support JCR signaling. In such examples, the UE 115-*a* may transmit radar signals carrying data (e.g., radar-centric JCR), the UE 115-*a* may transmit communications signaling that may additionally be used for radar sensing (e.g., communication-centric JCR), or a combination thereof. In other words, a JCR signal may be a signal that carries data or control information in addition to being measured for radar sensing of objects in the environment.

In some cases, a UE 115 may support single-band communication centric JCR (e.g., 73 GHZ) as described with reference to FIG. 3. In such cases, the UE 115 may support a small radar range of operation for a wide field of view or a narrow field of view for long range radar sensing, which may result in poor radar range estimation at long target distances. Additionally or alternatively, single-band communication-centric radar sensing may result in multi-radar interference due to limited resources available in a single band as well as high power consumption at higher bands.

Accordingly, the wireless communications system 200 may support techniques for multi-band JCR operations. In some examples, one or more of the UEs 115 may report one or more capability messages 215 to a centralized controller node, such as the base station 105-*a* (or a RSU, a group leader UE 115, or other devices). A capability message 215 may indicate a capability of a respective UE 115 to support JCR operations. For example, a capability message 215 may indicate bands which support JCR operations (e.g., communication bands with full duplex radar receive capability), bands which fail to support JCR operations, or both. In some cases, the capability message 215 may include a set of codebook parameters (e.g., JCR waveform-beamforming codebook specifications) for each multi-band configuration that supports communication-centric full duplex radar features in at least one band of the respective multi-band configuration.

Additionally or alternatively, the capability message 215 may include a performance report indicating expected communications performance (e.g., peak throughput) and communication-centric radar performance (e.g., maximum detectable unambiguous range) for a multi-band set of parameters (e.g., configuration and codebook specification). That is, the performance report may indicate one or more thresholds (e.g., minimum, maximum, expected, or requested metrics) for communications, radar sensing, or both corresponding to a configuration for JCR operations over multiple bands. Additionally or alternatively, a performance report may indicate previous metrics associated with communications, radar, or both as described herein. For example, the UE 115 may transmit an acknowledgment to the controller node with a communication and radar performance report (e.g., KPIs) based on transmitting a JCR signal for both communications and radar sensing via multiple bands.

In some examples, the UE 115 may receive a control message indicating a set of parameters for JCR operations based on the capability message. For example, the base station 105-*a* may transmit the control message 225 in response to the capability message 215. The set of parameters may include or indicate resources allocated for the JCR operations (e.g., time-frequency-space resource allocation configuration/schedule), one or more codebook parameters, or a combination thereof, among other examples of configurations or parameters for JCR signaling. In some examples, the base station 105-*a* may select the set of parameters of the control message 225 using the capability message 215. For example, the base station 105-*a* may configure resources and parameters that satisfy thresholds indicated in the capability message 215. The UE 115 may transmit a multi-band JCR signal with the indicated codebook parameters (e.g., requested parameters or parameters that otherwise satisfy one or more thresholds of the capability of the UE 115) via the allocated resources. In some examples, the multi-band communication or communication-centric radar operation may be over a sidelink channel (e.g., PC5), an uplink channel or a downlink channel (e.g., uplink/downlink Uu channel), or any combination thereof.

As an illustrative example of the techniques described herein, the UE 115-*a* may transmit the capability message 215-*a* to base station 105-*a* indicating a set of bands which support JCR operation, a set of bands which fail to support JCR operations, or both. The base station 105-*a* may determine a set of parameters for JCR operations (e.g., a multi-band JCR configuration) based on the capability message 215-*a* and may transmit control message 225 to the UE 115-*a* indicating the set of parameters. The set of parameters may include resources allocated for JCR operations. The UE 115-*a* may transmit JCR signal 230-*a* to the UE 115-*b* in the allocated resources in accordance with the set of parameters. In some examples, the UE 115-*a* may transmit the capability message 215-*b* to the base station 105-*a* including an acknowledgment and a communication and radar performance report based on the JCR signal 230-*a*. For example, the UE 115-*a* may estimate KPI metrics for radar and/or communications performance of the JCR signal 230-*a* and indicate the metrics in the capability message 215-*b*. The base station 105-*a* may use the indicated metrics to adjust one or more parameters for subsequent JCR operations. Though described as a single signal 230-*a* for descriptive clarity, the JCR signal 230-*b* may include any type or quantity of signaling.

In some cases, the capability message 215-*a* may indicate which bands support JCR operation (e.g., which bands correspond with a full duplex radar receive capability at the UE 115-*a*). As a first example, the capability message 215-*a* may indicate that a first band (e.g., 28 GHZ) and a second band (e.g., 73 GHZ) both support full-duplex communication-centric radar operation. In a second example, the capability message 215-*a* may indicate that a first band (e.g., 28 GHz) supports communication operations and fails to support radar operations while a second band (e.g., 73 GHZ) supports both communication and radar operation (e.g., JCR operations). In a third example, the capability message 215-*a* may indicate that a first band (e.g., 6 GHZ) supports communication operations and fails to support radar operations while a second band (e.g., 28 GHz), a third band (e.g., 73 GHZ), and a fourth band (e.g., 140 GHz) supports both communication and radar operations.

In some cases, the capability message 215-*a* may include (e.g., indicate) communication capabilities (e.g., a threshold data rate and the like) and radar capabilities (e.g., a resolution of radar sensing and the like), in addition or alternative to joint capabilities such as a table showing a threshold (e.g., maximum) data rate for each radar resolution (e.g., a relatively higher resolution for radar sensing may result in a relatively lower data rate). In some cases, the joint capabilities may include hardware limits (e.g., antenna and duplexing capability limits and computing power limits). As an illustrative example, at higher radar resolutions, a UE 115 may experience reduced data input due to processing power being reserved for receiving or processing radar signals (e.g., in addition or alternative to reduced data input from air interface resources being diverted away from communication operations to radar operations).

In some examples, the capability message 215-*a* may include a set of codebook parameters (e.g., JCR waveform-beamforming codebook specifications) for each multi-band configuration that supports communication-centric full duplex radar features (e.g., functionalities, operations) in at least one band. For example, the UE 115-*a* may indicate the set of supported codebook parameters for various bands. Such parameters may include one or more sub-carrier spacing configurations, beamforming parameters, a radar reference signal (RRS) configuration, or any combination thereof. As a first illustrative example, for a first band (e.g., 28 GHz), the UE 115-*a* may support OFDM JCR with low or moderate sub-carrier spacing (SCS) configurations and beamforming codebook designs with moderate beam widths. For a beamforming codebook with wide beams, the UE 115 may support a communication mode without radar operations as self-interference may interfere with short range radar operations. As a second example, for a second band (e.g., 73 GHZ), a UE 115-*a* may support OFDM JCR with moderate or high SCS configurations and beamforming codebook designs with narrow beam widths. In such cases, an RRS codebook design configuration may be indicated (e.g., by the control message 225 or other control signaling), such as the placement of pilots in a time-frequency-space grid (e.g., maximum pilot duration and bandwidth, inter-pilot spacing, type of sequence used in the pilots, duty cycle), extended cyclic prefix (CP) duration (e.g., a percentage of a symbol duration), a repetition pattern of the RRS (e.g., an update rate), or any combination thereof.

In some cases, the capability message 215-*a* may include a performance report indicating expected communication performance, communication-centric radar performance for a given multi-band set of parameters, or both. The performance report may indicate communication KPIs such as throughput, latency, expected received signal to noise ratio (SNR), SINR, or any combination thereof. Additionally or alternatively, the performance report may include radar KPIs such as maximum and minimum unambiguous range/velocity/angular estimates, single and multi-target estimation accuracy, dynamic range, interference reports (e.g., SINR), or any combination thereof. For example, the maximum range achieved by a radar supporting JCR operations in a first band (e.g., 28 GHZ) may be larger than that of a second, higher band (e.g., 140 GHz band) radar due to high path loss, low penetration capability, and low RCS at relatively higher bands. Higher bands may support high-resolution radar sensing and high peak throughputs. The various capabilities and capability thresholds discussed herein may be per UE, per band, per band-combination, per-band-per-combination, or the like.

In some cases, the base station 105-*a* may select a set of parameters (e.g., a JCR configuration) for JCR operations over multiple bands based on criteria, thresholds, or metrics. Such criteria, thresholds, or metrics may include interference measurements, a capability of a destination communication receiver node (e.g., a capability of the UE 115-*b* as the target of the JCR signal 230-*b* for communications, which one or both of the UEs 115 may report to the controller node), environment (e.g., an amount of blockage between two communicating nodes in vehicular communications), threshold (e.g., minimum) desirable radar and communication KPI thresholds, priority weightings for radar and communication KPIs, or any combination thereof. In some cases, the communications priority weighting may be higher than the radar priority weighting, which may result in communications thresholds receiving a preference for selection of the set of parameters for JCR operations. Radar and communication weightings may also be used for weighted average based KPI techniques for multi-band JCR operations (e.g., the base station 105-*a* may performing resource allocation in multi-user communications where the KPI is data rate). As an example, the base station 105-*a* may select a set of parameters using KPIs that are weighted averages (or other statistical methods may be applied to the KPIs). In some cases, the base station 105-*a* may request a UE 115 to use selected parameters (e.g., a time-frequency-space resource configuration or schedule) for JCR operations and a selected codebook parameter (e.g., a waveform-beamforming transmit configuration) based on the capability thresholds and transmit configurations supported by the UE 115.

In some cases, the base station 105-*a* may select (e.g., configure, indicate, and the like) the set of parameters corresponding to a multi-band JCR configuration for two-stage communication-centric radar sensing. In other words, the various devices may be configured with or otherwise support multiple stage communications and radar sensing operations. In some examples, a first stage may result in coarse radar sensing (e.g., radar sensing with a relatively low resolution) and a second stage may result in fine radar sensing (e.g., radar sensing with a relatively high resolution).

As an illustrative example, the UE 115-*a* may transmit the JCR signal 230-*a* to UE 115-*b* during a first radar stage operation and the JCR signal 230-*b* during a second radar stage operation. The first radar stage operation may support low resolution sensing, a large threshold (e.g., maximum) unambiguous range, and a wide field of view and the base station 105-*a* may select a lower radio frequency band for the first stage (e.g., the base station 105-*a* may configure the lower frequency band for transmitting the JCR signal 230-*a* in the first stage). The lower radio frequency band may have a smaller path loss, higher RCS, material penetration capability, and fully digital MIMO capability for low-latency radar sensing in a wide field of view. Further, due to relatively smaller bandwidth and carrier frequency at lower bands, the radar target parameter estimation may be coarse.

The first radar stage operation may be used as an initial step of a radar sensing procedure, which can be followed by a tracking stage with finer resolution sensing in the coarse range-angle-Doppler target bins detected during the initial step. Stated alternatively, the second stage for transmitting the JCR signal 230-*b* may be based on the results of the first stage (e.g., the finer resolution radar sensing signal 230-*b* may be directed or beamformed within the target bin ranges/directions detected in the first stage). Further, a lower radio frequency band may enable or support a low power consumption mode.

The second radar stage operation may support high resolution sensing in the target bins detected during the first stage and the base station 105-*a* may select a higher radio frequency band for the second stage accordingly. Additionally or alternatively, the second radar stage operation may support high data rate communication in the direction of radar sensing (e.g., the JCR signal 230-*b* in the second stage may support higher data throughput and/or range, for example, due to the relatively narrow beamforming). Thus, multi-band techniques for JCR operations (e.g., the two stage or other multi-band techniques for JCR signaling over multiple bands) may result in improved data rate, radar sensing, or both, among other examples of thresholds and metrics (e.g., KPIs).

Additionally or alternatively, the techniques may enable the devices to prioritize radar or communications based on the capabilities of the devices. For example, if radar is given priority by the controller node (e.g., the base station 105-*a*), the communication data rate achieved in the other directions may be relatively lower than the main beam direction. That is, the base station 105-*a* may prioritize radar or communications for the JCR signals 230, for example, to satisfy thresholds of the communications performance report, thresholds of the radar performance report, or both.

In some cases, the base station 105 may select the set of parameters (e.g., multi-band JCR configuration) based on a radar interference measurement (e.g., SINR). For example, if the radar interference satisfies a threshold (e.g., is greater than a threshold interference) in a first band in first angular sectors, then the base station 105-*a* may allocate narrow band communications in a second non-interfering sector in the first band. In other words, if the interference measurement of a first angular sector of a band satisfies a threshold, the base station 105-*a* may indicate an allocation of narrow band communications in the second angular sector. Additionally or alternatively, the base station 105-*a* may indicate to use a tracking radar mode in the second non-interfering sector in the band.

In some cases, a UE 115 may support a radar mode with a wide field of view, such as in short or medium range radars or in scanning radars, in a second band experiencing relatively small interference (e.g., a high SINR). In some cases, a blockage may exist between a first UE 115 (e.g., communication source transmitter), such as the UE 115-*a*, and a second UE 115 (e.g., the destination), such as the UE 115-*b*. In some such cases, the UE 115-*a* may use a lower band for communications that may penetrate the blocking object or material. In some cases, UE 115-*a* may use a higher band for radar sensing to detect the blockage to avoid or mitigate collision.

In some cases, the UE 115-*a* may support a first band and a second band while the UE 115-*b* may support the first band but may fail to support the second band. In such cases, the base station 105-*a* may configure parameters for the multi-band JCR communication such that if the first band is not sufficient for radar, then the second band may be used for radar sensing. Further, the UEs 115 may support communications in the first band with higher priority weighing than the radar operations. For example, the UE 115-*a* may support a first band and a second band while the UE 115-*b* supports the first band but not the second band. In some such examples, the base station 105-*a* may transmit control message 225 configuring JCR signaling such that UE 115-*a* may transmit JCR signal 230-*a* in a first band to support radar sensing.

In some cases, the UE 115-*a* may support the first band and the second band for communications, where the second band supports radar sensing in a full duplex mode while the first band does not. In such cases, the base station 105 may configure the multi-band JCR communications such that if the first band is not sufficient for communications (e.g., the communications data rate or another metric via the first band fails to satisfy a threshold), then the second band may be used for data transmission. Further, the UE 115-*a* may support communications in the second band with lower priority weighting than the radar sensing. For example, the UE 115-*a* may support a first band and a second band for communications where the second band supports radar sensing in full duplex mode while the first band does not. Therefore, in some cases the base station 105-*a* may transmit control message 225 configuring JCR communication such that when the first band is not sufficient for communication, the UE 115-*a* may transmit JCR signal 230-*a* in a second band to support data transmission.

Figure 3:
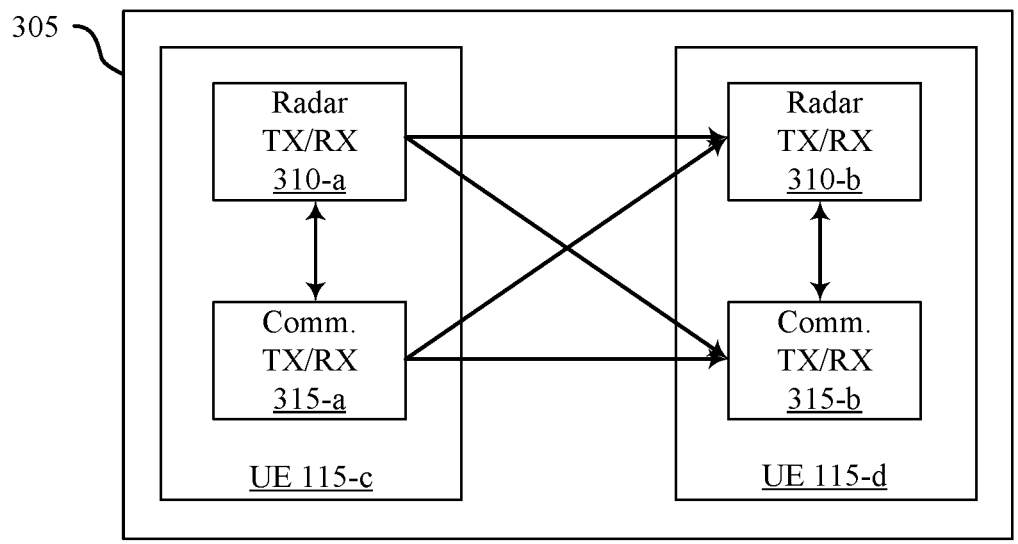
FIG. 3 illustrates an example of joint communication and radar systems that supports techniques for multi-band joint communications and radar in accordance with various aspects of the present disclosure.
Figure 3:
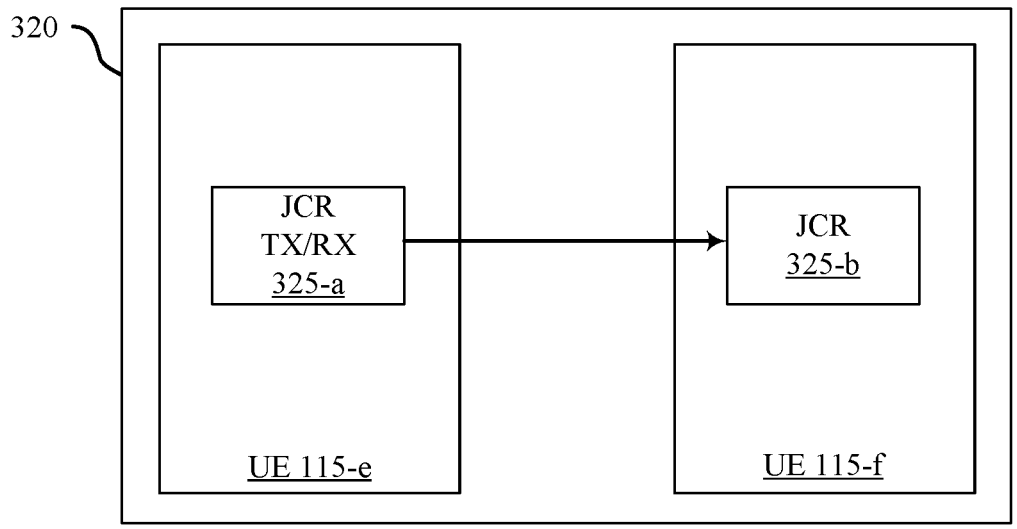

FIG. 3 illustrates an example of a joint communication and radar systems 300 that supports techniques for multi-band joint communications and radar in accordance with various aspects of the present disclosure. In some examples, joint communication and radar systems 300 may implement aspects of wireless communications system 100 and wireless communications system 200 and may include UE 115-*c*, UE 115-*d*, UE 115-*e*, and UE 115-*f*, which may be examples of UEs 115 and may communicate with one another as described herein with reference to FIG. 1 and FIG. 2. Although described as communications between UEs 115, any type or quantity of devices may implement the techniques described herein (e.g., multiple UEs 115, IoT devices, base stations 105, or any combination thereof, among other examples of wireless devices).

In some cases, the JCR system 305 may support co-located and cooperative radar and communication systems. Co-located and cooperative radar and communication systems may support sharing of knowledge between the communication and radar systems to improve performance, for example, without altering the core operations of the radar and communication systems. For example, the JCR system 305 may include the UE 115-*c* and the UE 115-*d*. The UE 115-*c* may include radar transmitter/receiver 310-*a* and communication transmitter/receiver 315-*a*, and the UE 115-*d* may include radar transmitter/receiver 310-*b* and communication transmitter/receiver 315-*b*. In some examples, the radar transmitter/receiver 310-*a* may transmit signaling to radar transmitter/receiver 310-*b*. The communication transmitter/receiver 315-*a* may transmit signaling to communication transmitter/receiver 315-*b*. In some examples, the radar transmitter/receiver 310-*a* may transmit signaling to the communication transmitter/receiver 315-*b*. The communication transmitter/receiver 315-*a* may transmit signaling to the radar transmitter/receiver 310-*b*. Additionally or alternatively, the radar transmitter/receiver 310-*a* may share knowledge with the communication transmitter/receiver 315-*a* of the UE 115-*c*, and the radar transmitter/receiver 310-*b* may share knowledge with the communication transmitter/receiver 315-*b* of the UE 115-*d*.

In some cases, the JCR system 320 may support co-design of communication and radar systems. Co-designed communication and radar systems may support a common transmitter or receiver which may be used for both communication and radar operations. In such cases, transmit waveform generation or receiver processing of both or either systems may be modified to support both communication and radar operations. Co-designed communication and radar systems may result in hardware and spectrum re-use. For example, the JCR system 320 may include the UE 115-e and the UE 115-f. The UE 115-e may include the JCR transmitter/receiver 325-a and the UE 115-f may include the JCR transmitter/receiver 325-b. The JCR transmitter/receiver 325-a may transmit signaling to the JCR transmitter/receiver 325-b to support both communication and radar operations.

Further, co-designed JCR may be communication-centric JCR or radar-centric JCR as described herein. Communication-centric JCR may support use of communication waveforms (e.g., OFDM or CDMA) for radar sensing. In some cases, communication-centric radar sensing may be in a single-band (e.g., 73 GHz band). In such cases, a trade-off may exist between a threshold (e.g., maximum) range of operation and achievable field of view for radar sensing at higher bands due to high path loss and low target-radar cross section. That is, the UE 115-e or the UE 115-f supporting single-band communication-centric radar sensing may support a small radar range of operation with a wide field of view or a long radar range of operation with a narrow field of view. In such cases (e.g., baseline OFDM radar), SCS may increase and cyclic prefix length may be reduced at higher bands, which may result in poor radar range estimation at long target distances.

Additionally or alternatively, single-band communication-centric radar sensing may result in relatively limited velocity estimates. That is, velocity estimation may be limited by SCS and carrier frequency band (e.g., in baseline OFDM). As an illustrative example, a 28 GHz NR OFDM radar with 120 kHz SCS may support a 25 m/s velocity without inter-carrier interference. However, lower bands with a smaller carrier frequency of 6 GHz and 30 kHz SCS may support a 75 m/s unambiguous velocity estimate. In some cases, higher bands may support analog beamforming resulting in high latency target detection or MIMO with low-resolution analog to digital converters (ADCs) resulting in low dynamic range. Additionally or alternatively, single-band communication-centric radar sensing may experience multi-radar interference due to limited resource availability in a single band. (e.g., multiple radar sources may cause significant interference). The radar interference may be a limiting factor due to the one-way direct interference path loss being much stronger that the reflected target desired echoes (R2 vs R4 decay). In some cases, radar at higher bands may suffer from high power consumption.

Wireless devices, such as UEs, RSUs, base stations, or the like thereof, may support multi-band functionality which may be utilized for multi-band JCR, as described with reference to FIG. 2. That is, multiple bands within a radio frequency band, or across multiple radio frequency bands (e.g., sub-6 GHz, 28 GHz, 60 GHz, 73 GHz, or 140 GHz) may be utilized for JCR operations as described herein. Such multi-band JCR operations may result in one or more potential advantages. For example, multi-band JCR may result in frequency diversity, reduced radio frequency (RF) interference, improved detection of low RCS objects, support for vehicular communications at high bands (e.g., mmWave vehicular communications), or any combination thereof. Additionally or alternatively, the techniques providing for multi-band JCR may enable a low-latency radar search mode with reduced power consumption and coarse target parameter estimation accuracy, for example, due to longer range and a wider field of view at lower bands during an initial stage. Further, a second radar stage operation at a higher band with finer estimation accuracy may be supported in specific coarse range-angle-Doppler target bins detected during the initial stage as described herein.

Figure 4:
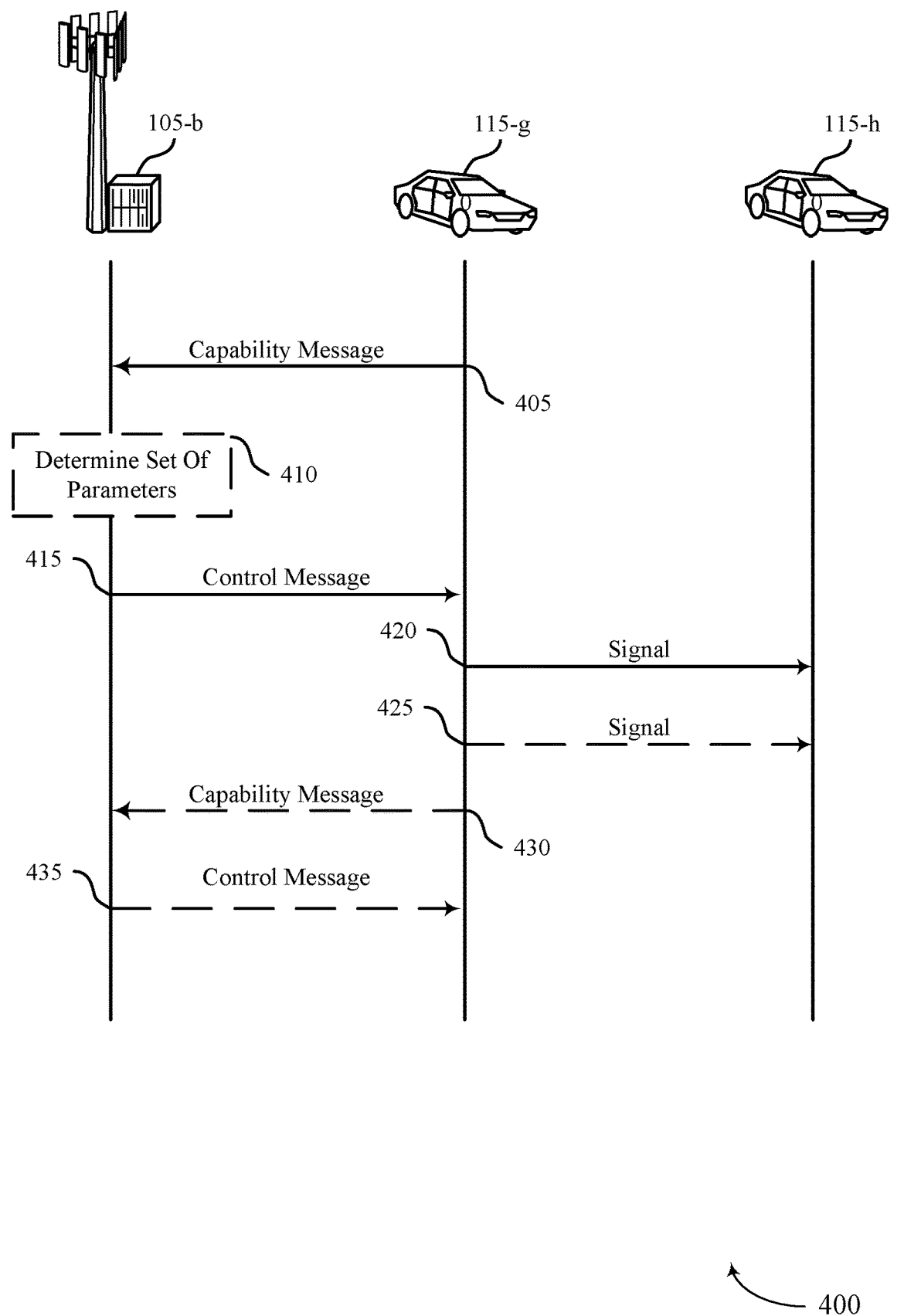
FIG. 4 illustrates an example of a process flow that supports techniques for multi-band joint communications and radar in accordance with various aspects of the present disclosure.

FIG. 4 illustrates an example of a process flow 400 that supports techniques for multi-band joint communications and radar in accordance with various aspects of the present disclosure. In some examples, process flow 400 may implement aspects of wireless communications system 100, wireless communications system 200, and joint communication and radar systems 300. For example, the process flow 400 may include the UE 115-g, the UE 115-h, and the base station 105-b, which may be examples of UEs 115 and a base station as described herein. Although described as communications between a UE 115 and a base station 105, any type or quantity of devices may implement the techniques described herein (e.g., the base station 105 may be an example of a wireless node such as a centralized communications node, which may additionally or alternatively include other UEs 115, RSUs, and the like).

At 405, the UE 115-g may transmit a capability message indicating whether a set of bands are associated with JCR operations, the JCR operations including signaling for both radar sensing and communications. For example, the capability message may be an example of a capability message as described herein with reference to FIG. 2. In some examples, the capability message may indicate that a first set of bands supports JCR operations, a second set of bands fails to support JCR operations, or both. In some cases, the capability message may indicate a set of codebook parameters including one or more SCS configurations, beamforming parameters, an RRS configuration, or any combination thereof for one or more bands that support the JCR operations. In some cases, the capability message may include a performance report for communications via one or more bands indicating a throughput, a latency, a signal to noise ratio, a signal to interference ratio, or any combination thereof. In some cases, the capability message may include a performance report for radar via one or more bands indicating a threshold range, a threshold velocity, a threshold angular estimate, a target estimation accuracy, an interference metric, or any combination thereof.

In some examples, at 410 the base station 105-b may determine a set of parameters based on the determined set of parameters satisfying one or more thresholds. The thresholds may include thresholds of the capability message, radar and communications thresholds, priority thresholds, interference thresholds, a capability of a receiver UE (e.g., the UE 115-h), or any combination thereof.

At 415, the UE 115-g may receive a control message, based on the capability message(s), from the base station 105-b indicating the set of parameters for JCR operations including resources allocated for the JCR operations. For example, the control message may be an example of a control message as described herein with reference to FIG. 2. In some examples, the set of parameters may include a configuration for waveform beamforming transmissions for the JCR operations based on the capability message(s). In some examples, the UE 115-g may receive, based on a radar interference of a first angular sector of a band satisfying a threshold, an indication allocating narrow band communications in a second angular sector of the band, an indication to use a tracking radar mode in the second angular sector of the band, or any combination thereof.

At 420, the UE 115-g may transmit via the allocated resources, a first signal for both radar sensing and communication to UE 115-h in accordance with the set of parameters. The first signal may be an example of a JCR signal as described herein. For example, the first signal may be a signal for both communications and radar sensing. In some examples, the UE 115-*g* may transmit the first signal in a first band based on the capabilities of the UE 115-*h*. Additionally or alternatively, the UE 115-*g* may transmit the first signal with a data rate that satisfies a threshold based on the UE 115-*h* supporting the first band for communication. In some examples, the first signal may be a first stage signal for radar sensing associated with a first set of metrics based on the set of parameters. The first set of metrics may include a first communication data rate.

In some examples, at 425, the UE 115-*g* may transmit a second signal in a second band based on the capabilities of the UE 115-*h*. In some examples, the second signal may be a second stage signal for radar sensing associated with a second set of metrics based on the set of parameters. The second set of metrics may include a second communication data rate greater than the first communication data rate. In some examples, the UE 115-*g* may transmit the first signal for radar sensing via the first band and the second signal for data communications via the second band based on the second band supporting radar sensing in full duplex mode.

In some examples, at 430, the UE 115-*g* may transmit a second capability message indicating one or more metrics associated with transmitting the signal(s) for both radar sensing and communications. In some examples, at 435, the UE 115-*g* may receive a second control message from the base station 105-*b*, based on the second capability message, indicating a second set of parameters.

Figure 5:
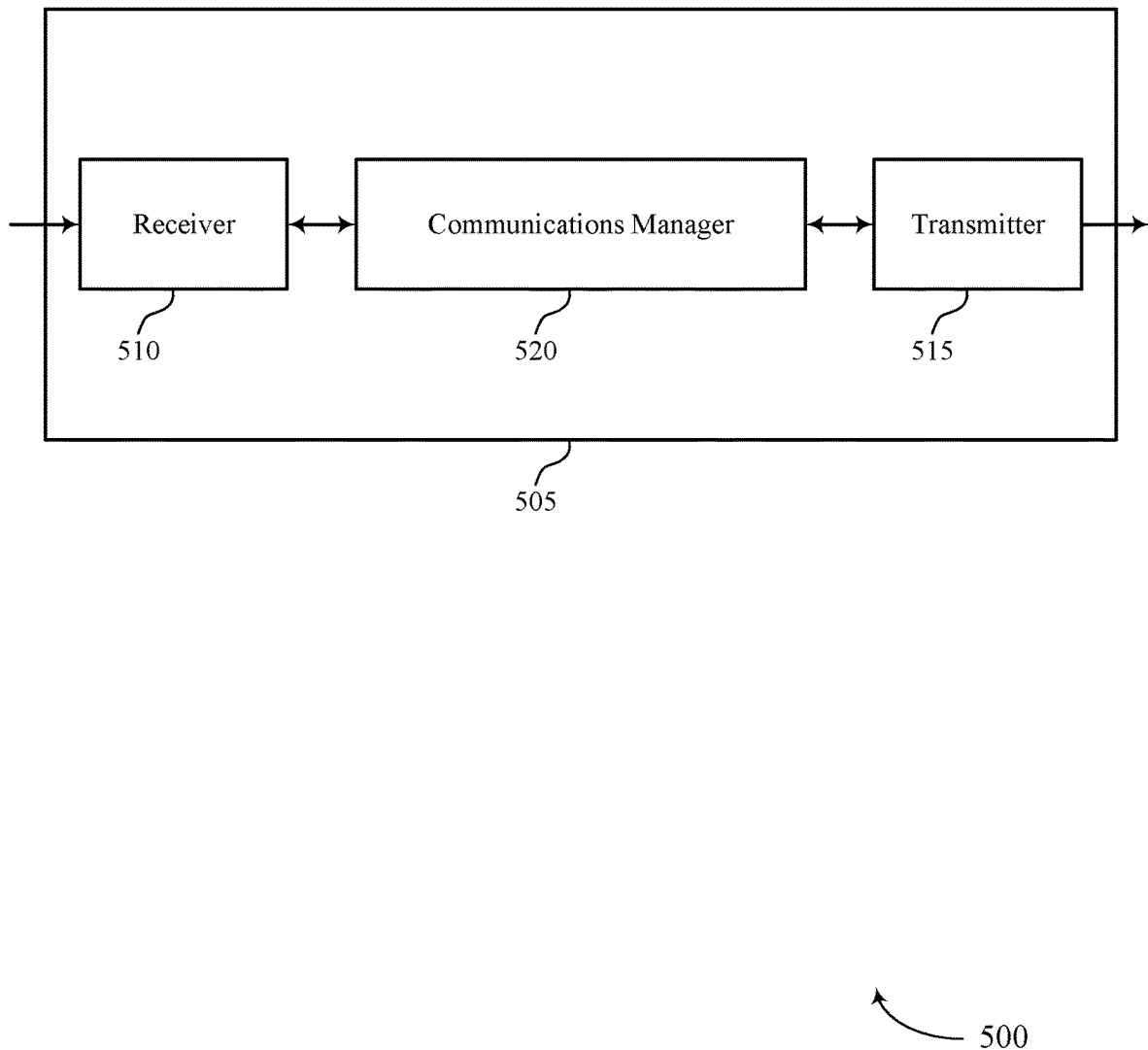
FIGS. 5 and 6 show block diagrams of devices that support techniques for multi-band joint communications and radar in accordance with various aspects of the present disclosure.

FIG. 5 shows a block diagram 500 of a device 505 that supports techniques for multi-band joint communications and radar in accordance with various aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for multi-band joint communications and radar). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for multi-band joint communications and radar). In some examples, the transmitter 515 may be co-located with a receiver 510 in a transceiver component. The transmitter 515 may utilize a single antenna or a set of multiple antennas.

The communications manager 520, the receiver 510, the transmitter 515, or various combinations thereof or various components thereof may be examples of means for performing various aspects of techniques for multi-band joint communications and radar as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at a UE in accordance with examples as disclosed herein. For example, the communications manager 520 may be configured as or otherwise support a means for transmitting, to a wireless node, a capability message indicating whether a set of bands are associated with joint communications and radar operations, the joint communications and radar operations including signaling for both radar sensing and communications. The communications manager 520 may be configured as or otherwise support a means for receiving, from the wireless node and based on the capability message, a control message indicating a set of parameters for the joint communications and radar operations, the set of parameters including resources allocated for the joint communications and radar operations. The communications manager 520 may be configured as or otherwise support a means for transmitting, via the resources, a signal for both radar sensing and communications in accordance with the set of parameters.

By including or configuring the communications manager 520 in accordance with examples as described herein, the device 505 (e.g., a processor controlling or otherwise coupled to the receiver 510, the transmitter 515, the communications manager 520, or a combination thereof) may support multi-band JCR techniques as described herein. For example, such techniques may enable device 505 to indicate the capability of the device 505, transmit JCR signals, and the like as described herein, which may result in increased power efficiency of the device 505, improved reliability of communications, or both, among other advantages.

Figure 6:
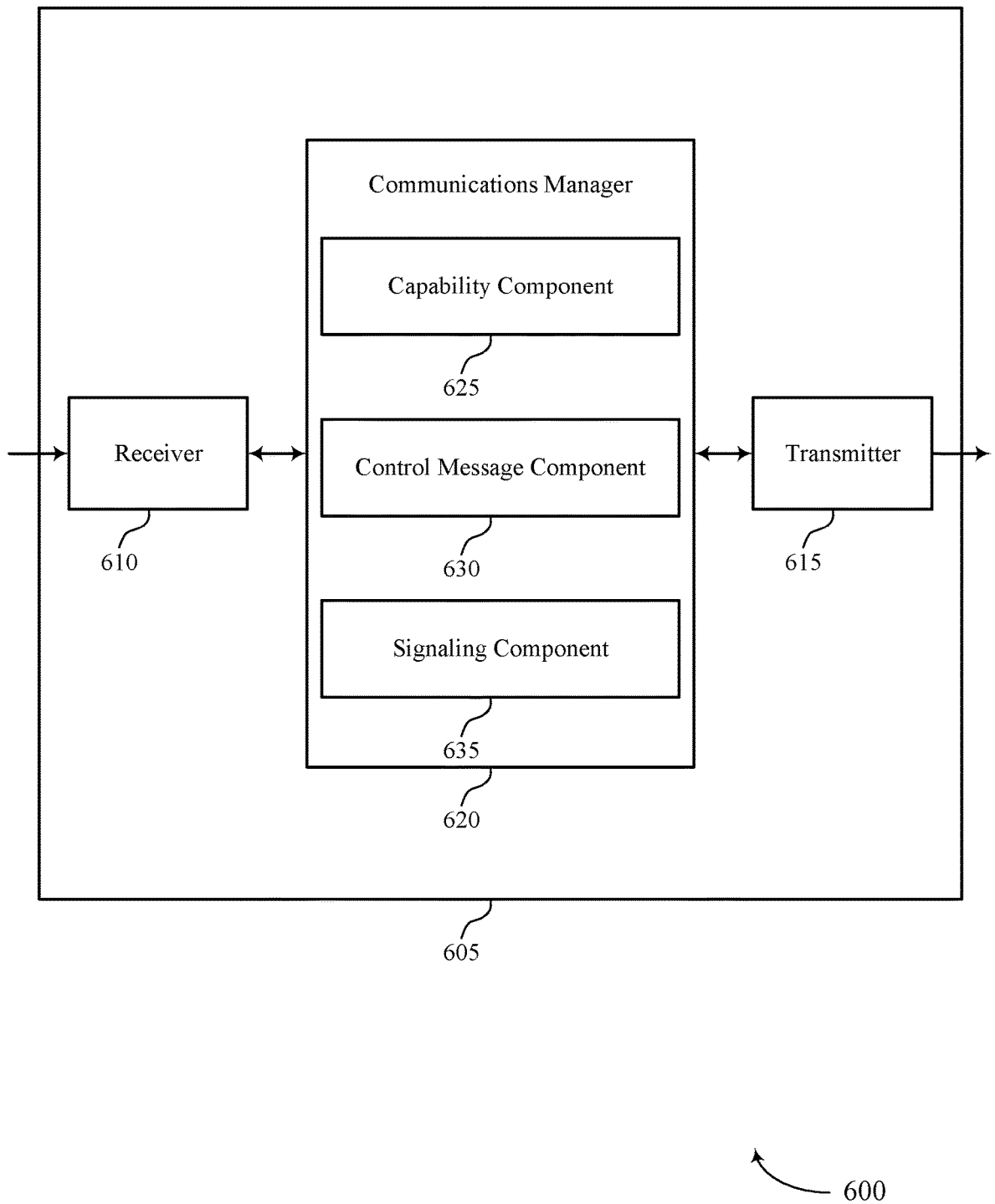

FIG. 6 shows a block diagram 600 of a device 605 that supports techniques for multi-band joint communications and radar in accordance with various aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for multi-band joint communications and radar). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for multi-band joint communications and radar). In some examples, the transmitter 615 may be co-located with a receiver 610 in a transceiver component. The transmitter 615 may utilize a single antenna or a set of multiple antennas.

The device 605, or various components thereof, may be an example of means for performing various aspects of techniques for multi-band joint communications and radar as described herein. For example, the communications manager 620 may include a capability component 625, a control message component 630, a signaling component 635, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a UE in accordance with examples as disclosed herein. The capability component 625 may be configured as or otherwise support a means for transmitting, to a wireless node, a capability message indicating whether a set of bands are associated with joint communications and radar operations, the joint communications and radar operations including signaling for both radar sensing and communications. The control message component 630 may be configured as or otherwise support a means for receiving, from the wireless node and based on the capability message, a control message indicating a set of parameters for the joint communications and radar operations, the set of parameters including resources allocated for the joint communications and radar operations. The signaling component 635 may be configured as or otherwise support a means for transmitting, via the resources, a signal for both radar sensing and communications in accordance with the set of parameters.

Figure 7:
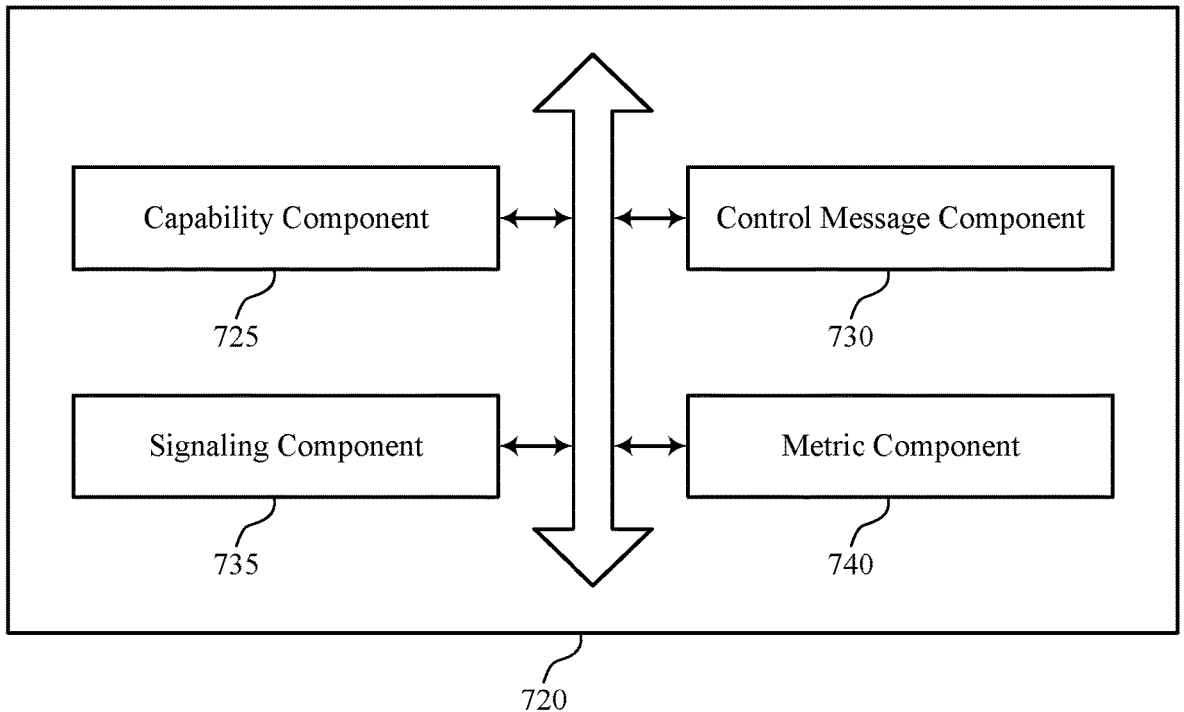
FIG. 7 shows a block diagram of a communications manager that supports techniques for multi-band joint communications and radar in accordance with various aspects of the present disclosure.

FIG. 7 shows a block diagram 700 of a communications manager 720 that supports techniques for multi-band joint communications and radar in accordance with various aspects of the present disclosure. The communications manager 720 may be an example of aspects of a communications manager 520, a communications manager 620, or both, as described herein. The communications manager 720, or various components thereof, may be an example of means for performing various aspects of techniques for multi-band joint communications and radar as described herein. For example, the communications manager 720 may include a capability component 725, a control message component 730, a signaling component 735, a metric component 740, or any combination thereof. Each of these components may communicate, directly or indirectly, with one another (e.g., via one or more buses).

The communications manager 720 may support wireless communications at a UE in accordance with examples as disclosed herein. The capability component 725 may be configured as or otherwise support a means for transmitting, to a wireless node, a capability message indicating whether a set of bands are associated with joint communications and radar operations, the joint communications and radar operations including signaling for both radar sensing and communications. The control message component 730 may be configured as or otherwise support a means for receiving, from the wireless node and based on the capability message, a control message indicating a set of parameters for the joint communications and radar operations, the set of parameters including resources allocated for the joint communications and radar operations. The signaling component 735 may be configured as or otherwise support a means for transmitting, via the resources, a signal for both radar sensing and communications in accordance with the set of parameters.

In some examples, to support transmitting the capability message, the capability component 725 may be configured as or otherwise support a means for transmitting an indication that a first subset of the set of bands supports the joint communications and radar operations, an indication that a second subset of the set of bands fails to support the joint communications and radar operations, or both.

In some examples, to support transmitting the capability message, the capability component 725 may be configured as or otherwise support a means for transmitting an indication of a set of codebook parameters for one or more bands of the set of bands that support the joint communications and radar operations, the set of codebook parameters including one or more sub-carrier spacing configurations, beamforming parameters, a radar reference signal configuration, or any combination thereof.

In some examples, to support transmitting the capability message, the capability component 725 may be configured as or otherwise support a means for transmitting a performance report for communications via one or more bands of the set of bands based on the set of parameters.

In some examples, the performance report indicates a throughput, a latency, a signal to noise ratio, a signal to interference ratio, or any combination thereof.

In some examples, to support transmitting the capability message, the capability component 725 may be configured as or otherwise support a means for transmitting a performance report for radar via one or more bands of the set of bands based on the set of parameters.

In some examples, the performance report indicates a threshold range, a threshold velocity, a threshold angular estimate, a target estimation accuracy, an interference metric, or any combination thereof.

In some examples, the set of parameters includes a configuration for waveform beamforming transmissions for the joint communications and radar operations based on the capability message.

In some examples, to support transmitting the signal for both radar sensing and communications, the signaling component 735 may be configured as or otherwise support a means for transmitting a first stage signal for radar sensing, the first stage signal associated with a first set of metrics based on the set of parameters. In some examples, to support transmitting the signal for both radar sensing and communications, the signaling component 735 may be configured as or otherwise support a means for transmitting a second stage signal for the radar sensing, the second stage signal associated with a second set of metrics based on the set of parameters.

In some examples, the first set of metrics includes a first communications data rate. In some examples, the second set of metrics includes a second communications data rate greater than the first communications data rate.

In some examples, to support receiving the control message, the control message component 730 may be configured as or otherwise support a means for receiving, based on a radar interference of a first angular sector of a band satisfying a threshold, an indication allocating narrow band communications in a second angular sector of the band, an indication to use a tracking radar mode in the second angular sector of the band, or any combination thereof.

In some examples, to support transmitting the signal for both radar sensing and communications, the signaling component 735 may be configured as or otherwise support a means for transmitting, to a second UE, a first signal via a first band based on a capability of the second UE. In some examples, to support transmitting the signal for both radar sensing and communications, the signaling component 735 may be configured as or otherwise support a means for transmitting a second signal via a second band based on the capability of the second UE.

In some examples, the signaling component 735 may be configured as or otherwise support a means for transmitting the first signal via the first band with a communications data rate that satisfies a threshold based at least in part the second UE supporting the first band for communications.

In some examples, the signaling component 735 may be configured as or otherwise support a means for transmitting the first signal for radar sensing via the first band and transmitting the second signal for data communications via the second band based on the second band supporting radar sensing in a full duplex mode.

In some examples, the capability component 725 may be configured as or otherwise support a means for transmitting, to the wireless node, a second capability message indicating one or more metrics associated with transmitting the signal for both radar sensing and communications. In some examples, the control message component 730 may be configured as or otherwise support a means for receiving, from the wireless node and based on the second capability message, a second control message indicating a second set of parameters.

Figure 8:
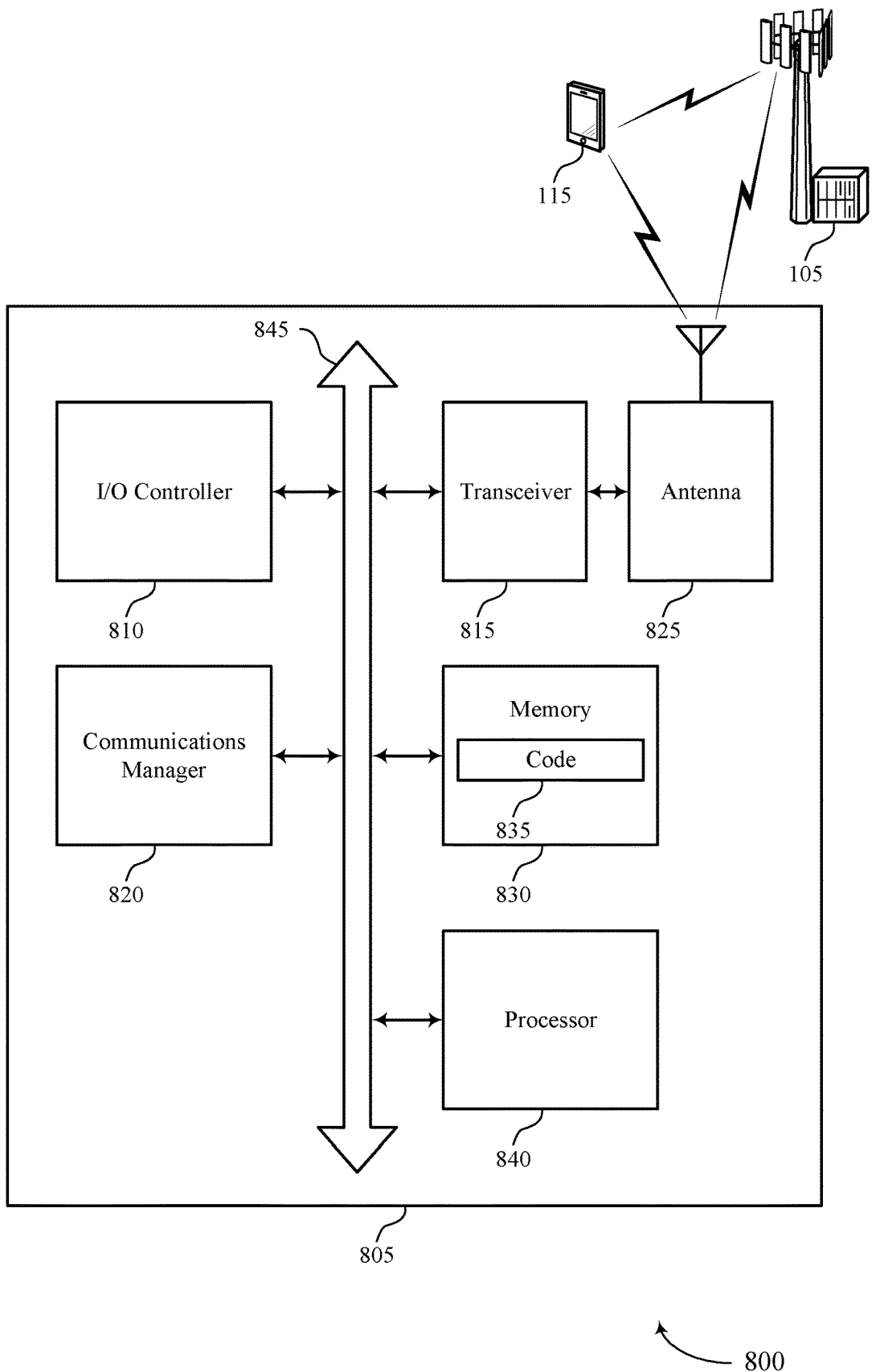
FIG. 8 shows a diagram of a system including a device that supports techniques for multi-band joint communications and radar in accordance with various aspects of the present disclosure.

FIG. 8 shows a diagram of a system 800 including a device 805 that supports techniques for multi-band joint communications and radar in accordance with various aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting techniques for multi-band joint communications and radar). For example, the device 805 or a component of the device 805 may include a processor 840 and memory 830 coupled to the processor 840, the processor 840 and memory 830 configured to perform various functions described herein.

The communications manager 820 may support wireless communications at a UE in accordance with examples as disclosed herein. For example, the communications manager 820 may be configured as or otherwise support a means for transmitting, to a wireless node, a capability message indicating whether a set of bands are associated with joint communications and radar operations, the joint communications and radar operations including signaling for both radar sensing and communications. The communications manager 820 may be configured as or otherwise support a means for receiving, from the wireless node and based on the capability message, a control message indicating a set of parameters for the joint communications and radar operations, the set of parameters including resources allocated for the joint communications and radar operations. The communications manager 820 may be configured as or otherwise support a means for transmitting, via the resources, a signal for both radar sensing and communications in accordance with the set of parameters.

By including or configuring the communications manager 820 in accordance with examples as described herein, the device 805 may support multi-band JCR techniques as described herein. For example, such techniques may enable device 505 to indicate the capability of the device 805, transmit JCR signals, and the like as described herein, which may result in increased power efficiency of the device 805, improved reliability of communications, reduced latency, improved user experience related to reduced processing, more efficient utilization of communication resources, improved coordination between devices, improved utilization of processing capability, or a combination thereof, among other advantages.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of techniques for multi-band joint communications and radar as described herein, or the processor 840 and the memory 830 may be otherwise configured to perform or support such operations.

Figure 9:
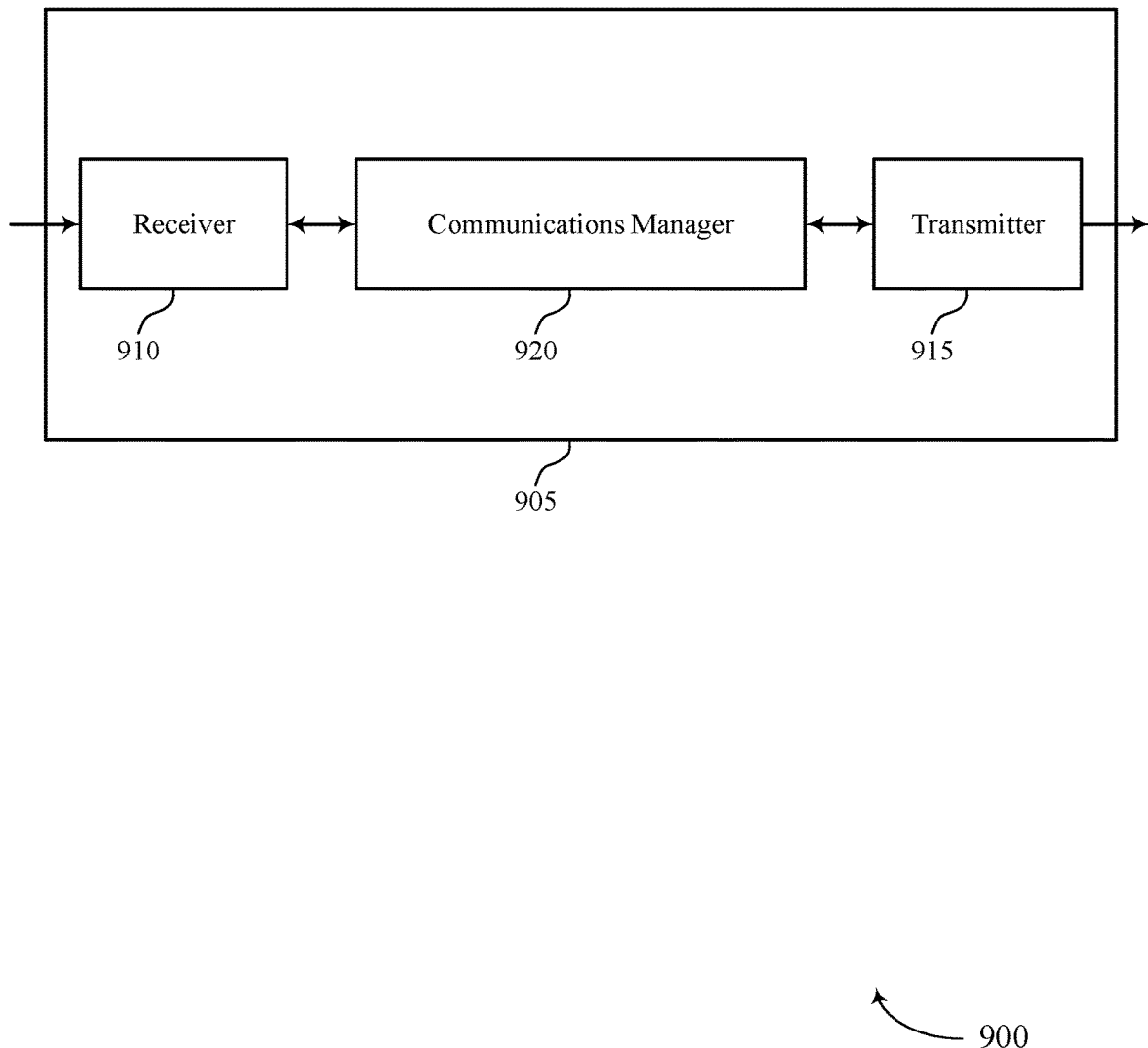
FIGS. 9 and 10 show block diagrams of devices that support techniques for multi-band joint communications and radar in accordance with various aspects of the present disclosure.

FIG. 9 shows a block diagram 900 of a device 905 that supports techniques for multi-band joint communications and radar in accordance with various aspects of the present disclosure. The device 905 may be an example of aspects of a wireless node (e.g., a base station 105, an RSU, a UE 115, or other wireless devices) as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to techniques for multi-band joint communications and radar). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to techniques for multi-band joint communications and radar). In some examples, the transmitter 915 may be co-located with a receiver 910 in a transceiver component. The transmitter 915 may utilize a single antenna or a set of multiple antennas.

The communications manager 920, the receiver 910, the transmitter 915, or various combinations thereof or various components thereof may be examples of means for performing various aspects of techniques for multi-band joint communications and radar as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a wireless node in accordance with examples as disclosed herein. For example, the communications manager 920 may be configured as or otherwise support a means for receiving, from a UE, a capability message indicating whether a set of bands are associated with joint communications and radar operations, the joint communications and radar operations including signaling for both radar sensing and communications. The communications manager 920 may be configured as or otherwise support a means for transmitting, to the UE and based on the capability message, a control message indicating a set of parameters for the joint communications and radar operations, the set of parameters including resources allocated for the joint communications and radar operations. The communications manager 920 may be configured as or otherwise support a means for receiving, via the resources, a second capability message associated with the joint communications and radar operations based on the set of parameters.

By including or configuring the communications manager 920 in accordance with examples as described herein, the device 905 (e.g., a processor controlling or otherwise coupled to the receiver 910, the transmitter 915, the communications manager 920, or a combination thereof) may support multi-band JCR techniques as described herein. For example, such techniques may enable device 905 to receive an indication of the capability of a first device, determine a set of parameters for JCR operations, transmit the set of parameters to the first device, and the like as described herein, which may result in increased power efficiency of the device 905, improved reliability of communications, or both, among other advantages.

Figure 10:
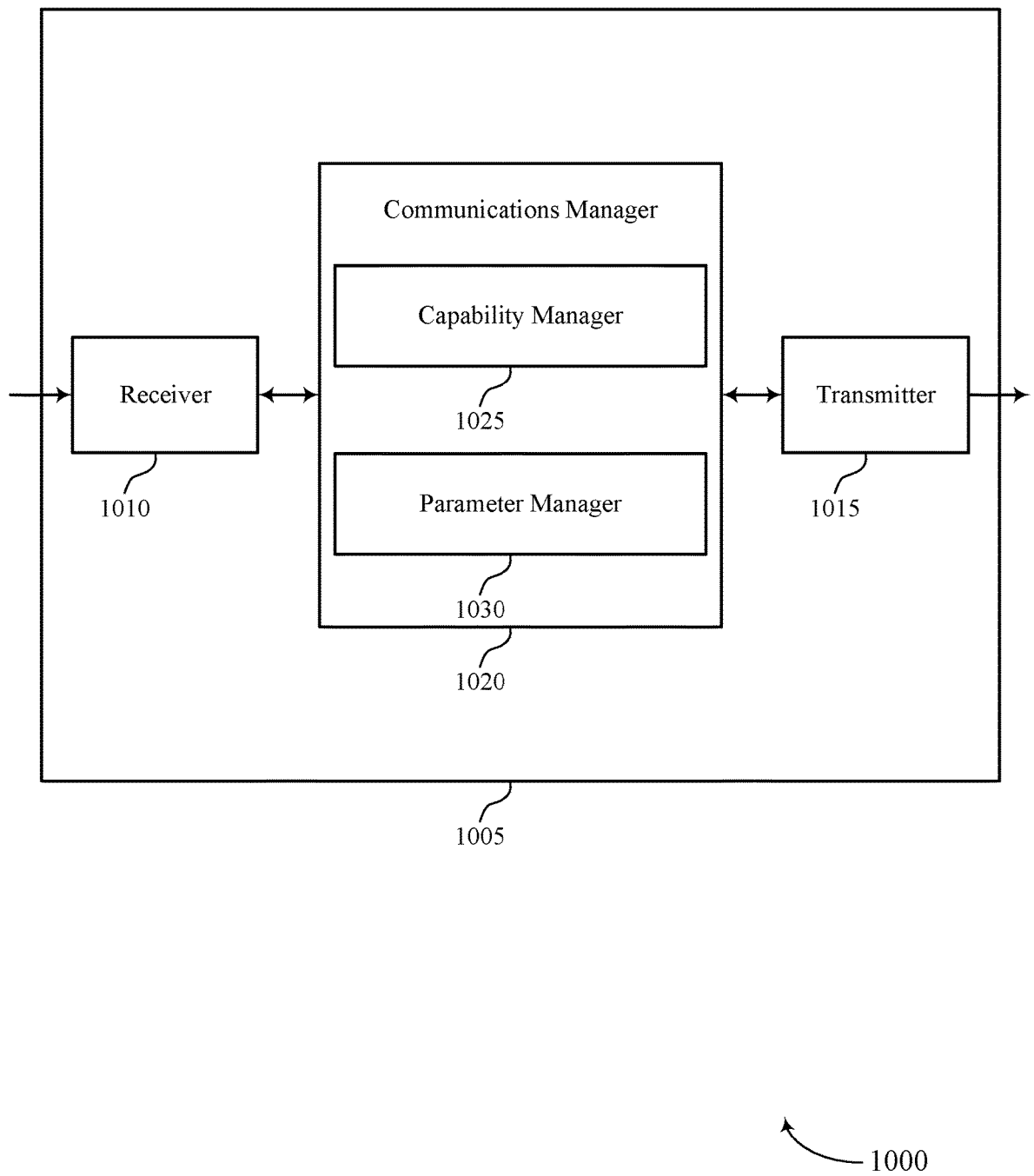

FIG. 10 shows a block diagram 1000 of a device 1005 that supports techniques for multi-band joint communications and radar in accordance with various aspects of the present disclosure. The device 1005 may be an example of aspects of a device 905 or a wireless node as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to techniques for multi-band joint communications and radar). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to techniques for multi-band joint communications and radar). In some examples, the transmitter 1015 may be co-located with a receiver 1010 in a transceiver component. The transmitter 1015 may utilize a single antenna or a set of multiple antennas.

The device 1005, or various components thereof, may be an example of means for performing various aspects of techniques for multi-band joint communications and radar as described herein. For example, the communications manager 1020 may include a capability manager 1025 a parameter manager 1030, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at a wireless node in accordance with examples as disclosed herein. The capability manager 1025 may be configured as or otherwise support a means for receiving, from a UE, a capability message indicating whether a set of bands are associated with joint communications and radar operations, the joint communications and radar operations including signaling for both radar sensing and communications. The parameter manager 1030 may be configured as or otherwise support a means for transmitting, to the UE and based on the capability message, a control message indicating a set of parameters for the joint communications and radar operations, the set of parameters including resources allocated for the joint communications and radar operations. The capability manager 1025 may be configured as or otherwise support a means for receiving, via the resources, a second capability message associated with the joint communications and radar operations based on the set of parameters.

Figure 11:
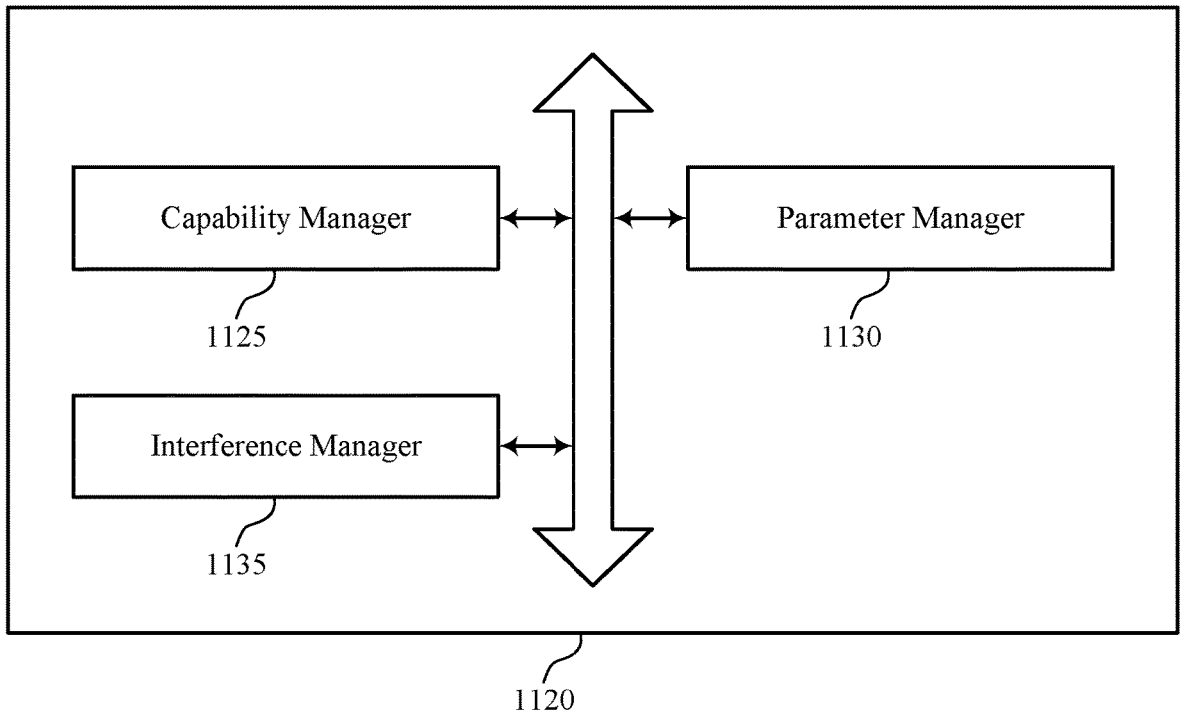
FIG. 11 shows a block diagram of a communications manager that supports techniques for multi-band joint communications and radar in accordance with various aspects of the present disclosure.

FIG. 11 shows a block diagram 1100 of a communications manager 1120 that supports techniques for multi-band joint communications and radar in accordance with various aspects of the present disclosure. The communications manager 1120 may be an example of aspects of a communications manager 920, a communications manager 1020, or both, as described herein. The communications manager 1120, or various components thereof, may be an example of means for performing various aspects of techniques for multi-band joint communications and radar as described herein. For example, the communications manager 1120 may include a capability manager 1125, a parameter manager 1130, an interference manager 1135, or any combination thereof. Each of these components may communicate, directly or indirectly, with one another (e.g., via one or more buses).

The communications manager 1120 may support wireless communications at a wireless node in accordance with examples as disclosed herein. The capability manager 1125 may be configured as or otherwise support a means for receiving, from a UE, a capability message indicating whether a set of bands are associated with joint communications and radar operations, the joint communications and radar operations including signaling for both radar sensing and communications. The parameter manager 1130 may be configured as or otherwise support a means for transmitting, to the UE and based on the capability message, a control message indicating a set of parameters for the joint communications and radar operations, the set of parameters including resources allocated for the joint communications and radar operations. In some examples, the capability manager 1125 may be configured as or otherwise support a means for receiving, via the resources, a second capability message associated with the joint communications and radar operations based on the set of parameters.

In some examples, to support receiving the capability message, the capability manager 1125 may be configured as or otherwise support a means for receiving an indication that a first subset of the set of bands supports the joint communications and radar operations, an indication that a second subset of the set of bands fails to support the joint communications and radar operations, or both.

In some examples, to support receiving the capability message, the capability manager 1125 may be configured as or otherwise support a means for receiving an indication of a set of codebook parameters for one or more bands of the set of bands that support the joint communications and radar operations, the set of codebook parameters including one or more sub-carrier spacing configurations, beamforming parameters, a radar reference signal configuration, or any combination thereof.

In some examples, to support receiving the capability message, the capability manager 1125 may be configured as or otherwise support a means for receiving a performance report for communications via one or more bands of the set of bands based on the set of parameters.

In some examples, the performance report indicates a throughput, a latency, a signal to noise ratio, a signal to interference ratio, or any combination thereof.

In some examples, to support receiving the capability message, the capability manager 1125 may be configured as or otherwise support a means for receiving a performance report for radar via one or more bands of the set of bands based on the set of parameters.

In some examples, the performance report indicates a threshold range, a threshold velocity, a threshold angular estimate, a target estimation accuracy, an interference metric, or any combination thereof.

In some examples, the set of parameters includes a configuration for waveform beamforming transmissions for the joint communications and radar operations based on the capability message.

In some examples, the parameter manager 1130 may be configured as or otherwise support a means for determining the set of parameters based on the set of parameters satisfying one or more thresholds, the one or more thresholds including thresholds of the capability message, radar and communications thresholds, priority thresholds, interference thresholds, a capability of a receiver UE, or any combination thereof.

In some examples, the set of parameters includes a first set of parameters for a first stage signal and a second set of parameters for a second stage signal.

In some examples, to support transmitting the control message, the interference manager 1135 may be configured as or otherwise support a means for transmitting, based on a radar interference of a first angular sector of a band satisfying a threshold, an indication allocating narrow band communications in a second angular sector of the band, an indication to use a tracking radar mode in the second angular sector of the band, or any combination thereof.

In some examples, the parameter manager 1130 may be configured as or otherwise support a means for transmitting, to the UE and based on the second capability message, a second control message indicating a second set of parameters.

Figure 12:
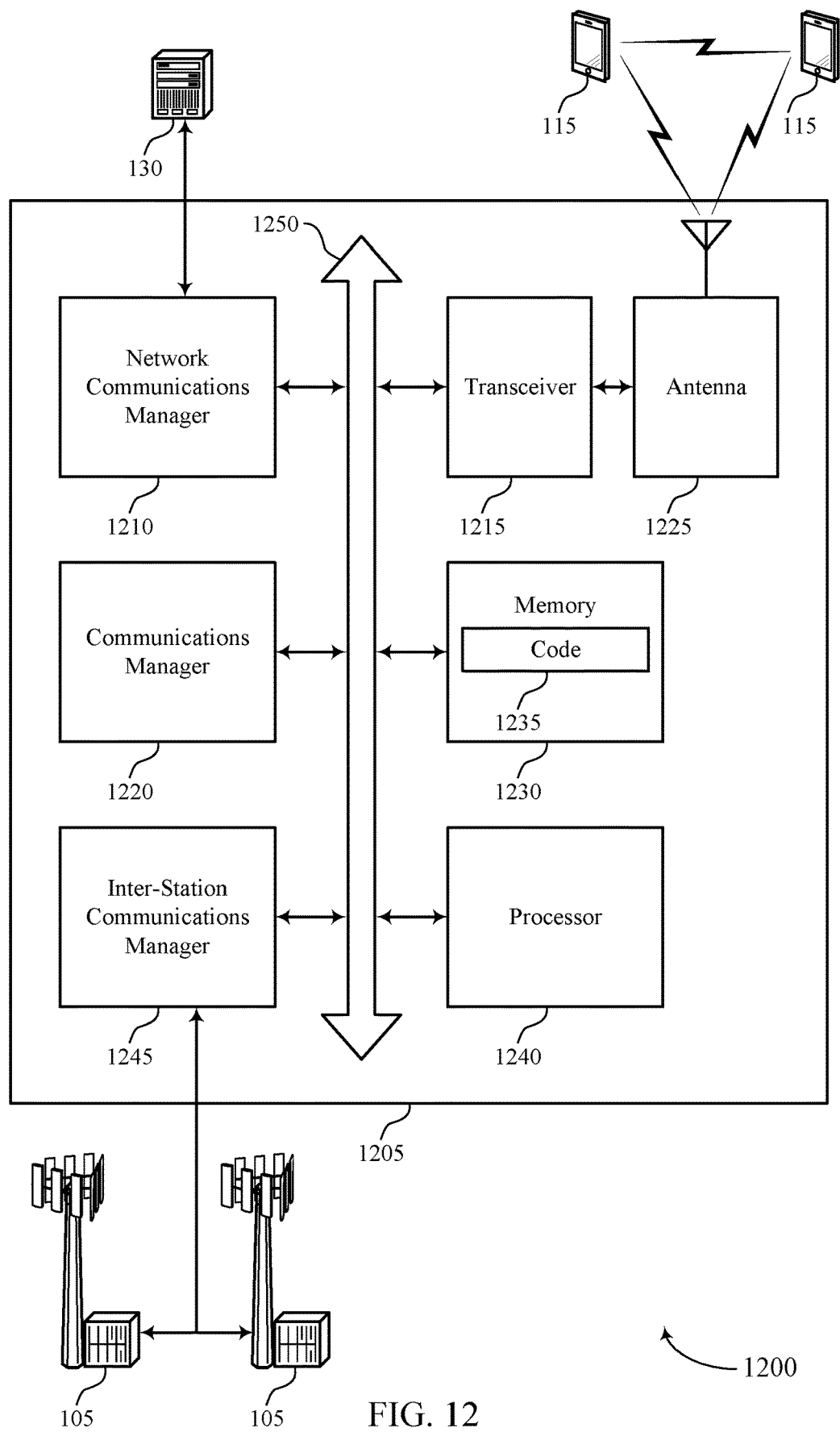
FIG. 12 shows a diagram of a system including a device that supports techniques for multi-band joint communications and radar in accordance with various aspects of the present disclosure.

FIG. 12 shows a diagram of a system 1200 including a device 1205 that supports techniques for multi-band joint communications and radar in accordance with various aspects of the present disclosure. The device 1205 may be an example of or include the components of a device 905, a device 1005, or a wireless node as described herein. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting techniques for multi-band joint communications and radar). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105 and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communications at a wireless node in accordance with examples as disclosed herein. For example, the communications manager 1220 may be configured as or otherwise support a means for receiving, from a UE, a capability message indicating whether a set of bands are associated with joint communications and radar operations, the joint communications and radar operations including signaling for both radar sensing and communications. The communications manager 1220 may be configured as or otherwise support a means for transmitting, to the UE and based on the capability message, a control message indicating a set of parameters for the joint communications and radar operations, the set of parameters including resources allocated for the joint communications and radar operations. The communications manager 1220 may be configured as or otherwise support a means for receiving, via the resources, a second capability message associated with the joint communications and radar operations based on the set of parameters.

By including or configuring the communications manager 1220 in accordance with examples as described herein, the device 1205 may support multi-band JCR techniques as described herein. For example, such techniques may enable device 1205 to receive an indication of the capability of the first device, determine a set of parameters for JCR operations, transmit the set of parameters to a first device, and the like as described herein, which may result in increased power efficiency of the device 1205, improved reliability of communications, reduced latency, improved user experience related to reduced processing, more efficient utilization of communication resources, improved coordination between devices, improved utilization of processing capability, or a combination thereof, among other advantages.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of techniques for multi-band joint communications and radar as described herein, or the processor 1240 and the memory 1230 may be otherwise configured to perform or support such operations.

Figure 13:
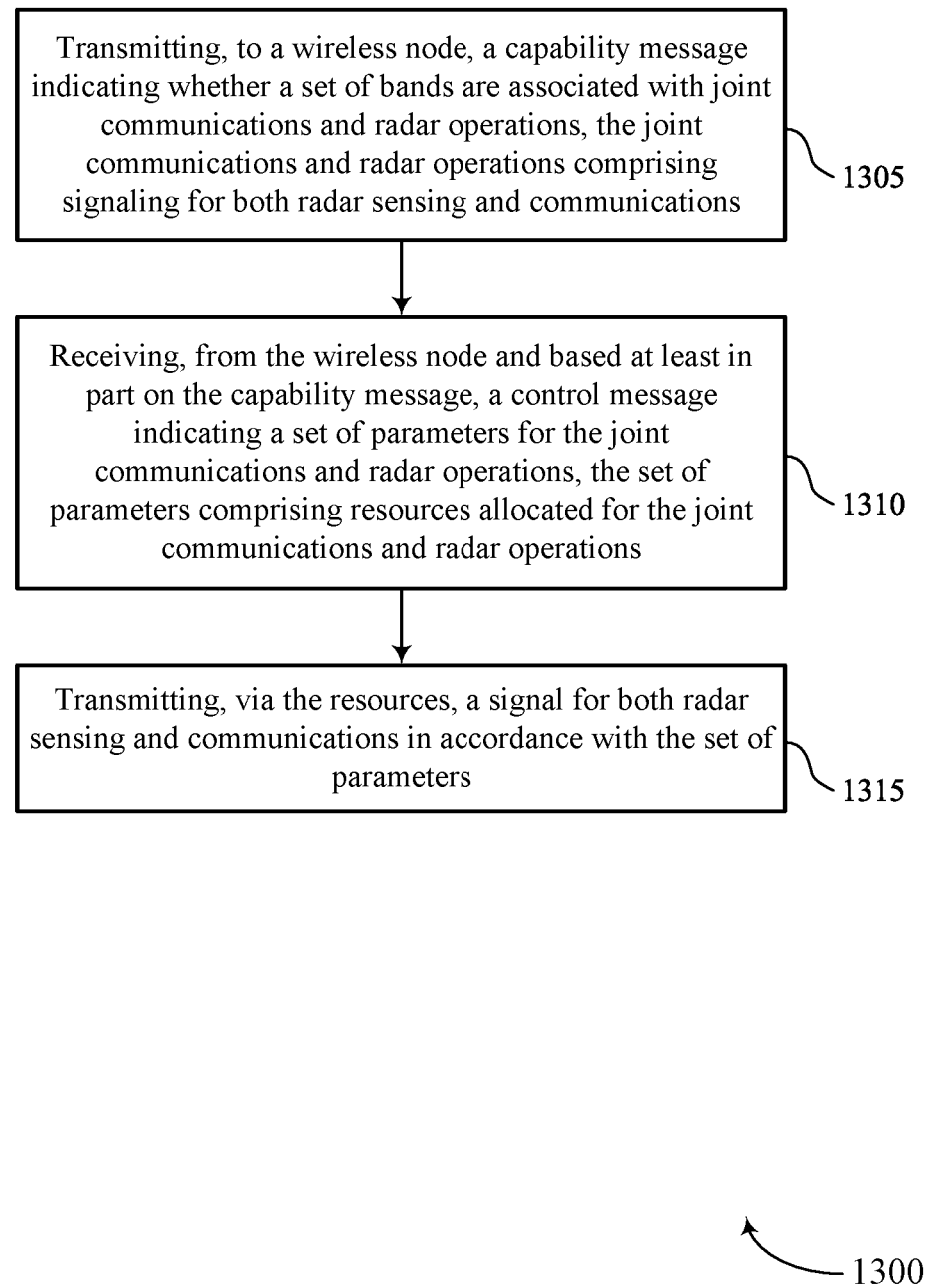
FIGS. 13 through 16 show flowcharts illustrating methods that support techniques for multi-band joint communications and radar in accordance with various aspects of the present disclosure.

FIG. 13 shows a flowchart illustrating a method 1300 that supports techniques for multi-band joint communications and radar in accordance with various aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include transmitting, to a wireless node, a capability message indicating whether a set of bands are associated with joint communications and radar operations, the joint communications and radar operations including signaling for both radar sensing and communications. The operations of 1305 may be performed in accordance with examples as disclosed herein. In some examples, aspects of the operations of 1305 may be performed by a capability component 725 as described with reference to FIG. 7.

At 1310, the method may include receiving, from the wireless node and based on the capability message, a control message indicating a set of parameters for the joint communications and radar operations, the set of parameters including resources allocated for the joint communications and radar operations. The operations of 1310 may be performed in accordance with examples as disclosed herein. In some examples, aspects of the operations of 1310 may be performed by a control message component 730 as described with reference to FIG. 7.

At 1315, the method may include transmitting, via the resources, a signal for both radar sensing and communications in accordance with the set of parameters. The operations of 1315 may be performed in accordance with examples as disclosed herein. In some examples, aspects of the operations of 1315 may be performed by a signaling component 735 as described with reference to FIG. 7.

Figure 14:
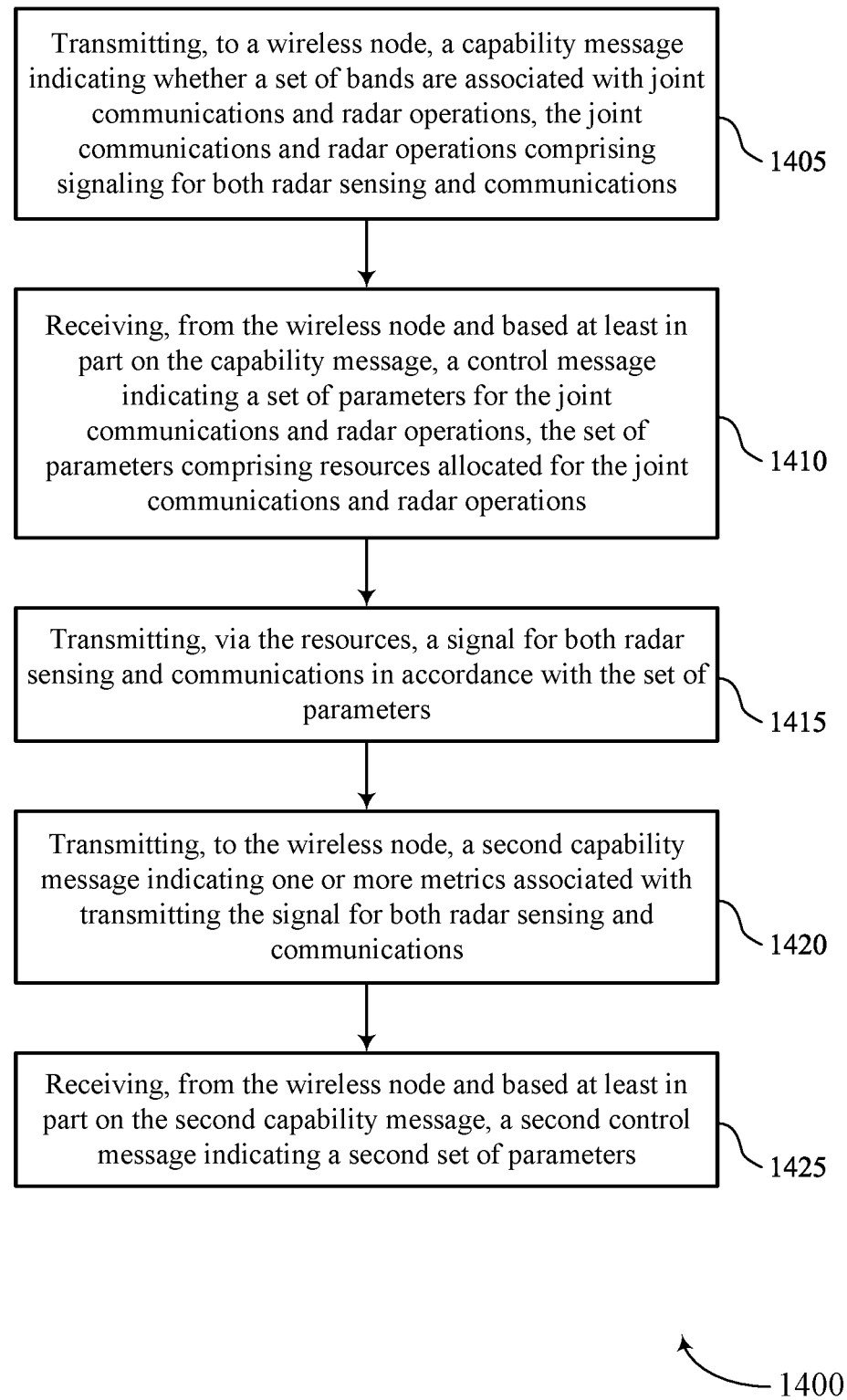

FIG. 14 shows a flowchart illustrating a method 1400 that supports techniques for multi-band joint communications and radar in accordance with various aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1405, the method may include transmitting, to a wireless node, a capability message indicating whether a set of bands are associated with joint communications and radar operations, the joint communications and radar operations including signaling for both radar sensing and communications. The operations of 1405 may be performed in accordance with examples as disclosed herein. In some examples, aspects of the operations of 1405 may be performed by a capability component 725 as described with reference to FIG. 7.

At 1410, the method may include receiving, from the wireless node and based on the capability message, a control message indicating a set of parameters for the joint communications and radar operations, the set of parameters including resources allocated for the joint communications and radar operations. The operations of 1410 may be performed in accordance with examples as disclosed herein. In some examples, aspects of the operations of 1410 may be performed by a control message component 730 as described with reference to FIG. 7.

At 1415, the method may include transmitting, via the resources, a signal for both radar sensing and communications in accordance with the set of parameters. The operations of 1415 may be performed in accordance with examples as disclosed herein. In some examples, aspects of the operations of 1415 may be performed by a signaling component 735 as described with reference to FIG. 7.

At 1420, the method may include transmitting, to the wireless node, a second capability message indicating one or more metrics associated with transmitting the signal for both radar sensing and communications. The operations of 1420 may be performed in accordance with examples as disclosed herein. In some examples, aspects of the operations of 1420 may be performed by a capability component 725 as described with reference to FIG. 7.

At 1425, the method may include receiving, from the wireless node and based on the second capability message, a second control message indicating a second set of parameters. The operations of 1425 may be performed in accordance with examples as disclosed herein. In some examples, aspects of the operations of 1425 may be performed by a control message component 730 as described with reference to FIG. 7.

Figure 15:
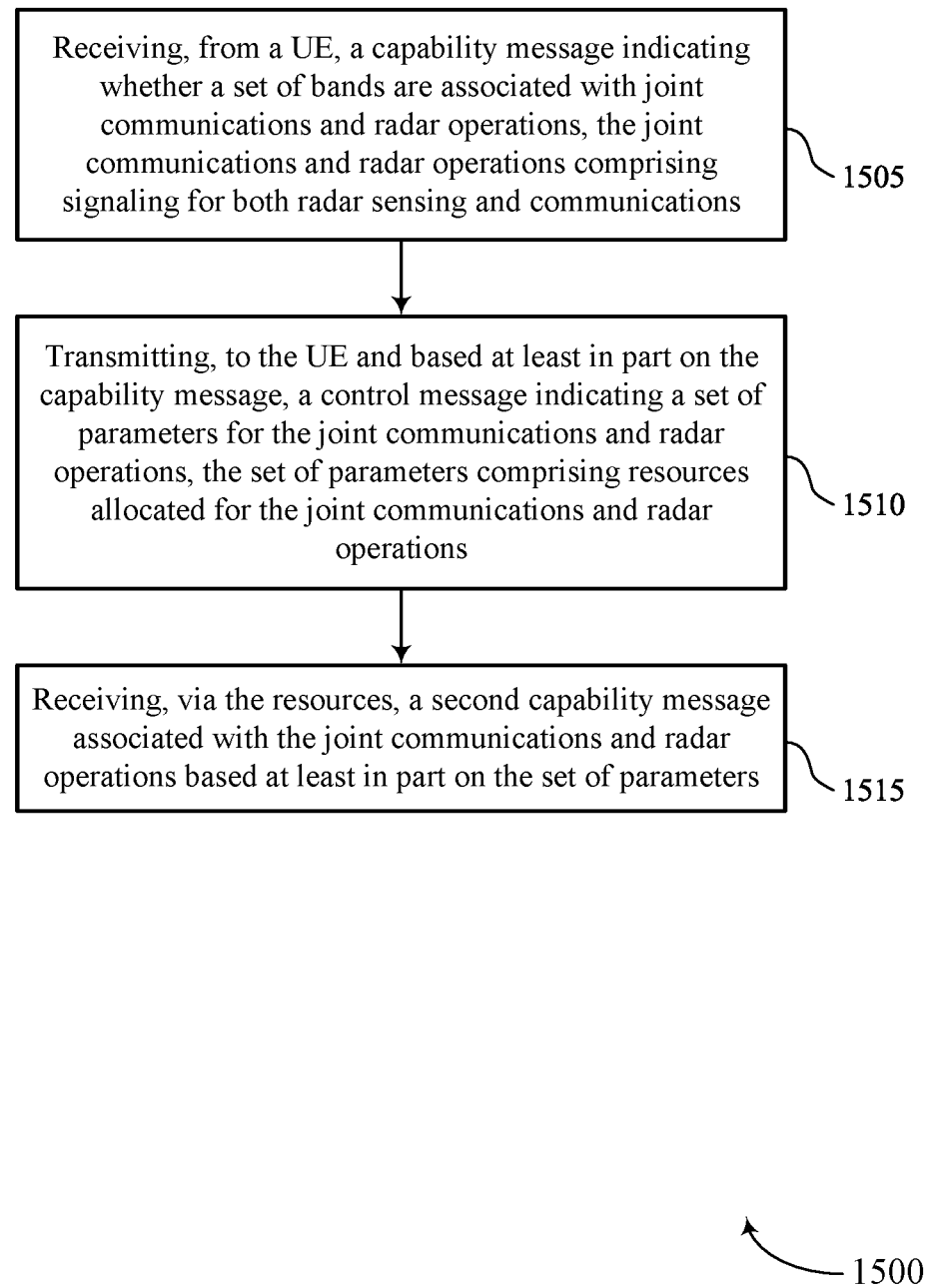

FIG. 15 shows a flowchart illustrating a method 1500 that supports techniques for multi-band joint communications and radar in accordance with various aspects of the present disclosure. The operations of the method 1500 may be implemented by a wireless node or its components as described herein. For example, the operations of the method 1500 may be performed by a wireless node as described with reference to FIGS. 1 through 4 and 9 through 12. In some examples, a wireless node may execute a set of instructions to control the functional elements of the wireless node to perform the described functions. Additionally or alternatively, the wireless node may perform aspects of the described functions using special-purpose hardware.

At 1505, the method may include receiving, from a UE, a capability message indicating whether a set of bands are associated with joint communications and radar operations, the joint communications and radar operations including signaling for both radar sensing and communications. The operations of 1505 may be performed in accordance with examples as disclosed herein. In some examples, aspects of the operations of 1505 may be performed by a capability manager 1125 as described with reference to FIG. 11.

At 1510, the method may include transmitting, to the UE and based on the capability message, a control message indicating a set of parameters for the joint communications and radar operations, the set of parameters including resources allocated for the joint communications and radar operations. The operations of 1510 may be performed in accordance with examples as disclosed herein. In some examples, aspects of the operations of 1510 may be performed by a parameter manager 1130 as described with reference to FIG. 11.

At 1515, the method may include receiving, via the resources, a second capability message associated with the joint communications and radar operations based on the set of parameters. The operations of 1515 may be performed in accordance with examples as disclosed herein. In some examples, aspects of the operations of 1515 may be performed by a capability manager 1125 as described with reference to FIG. 11.

Figure 16:
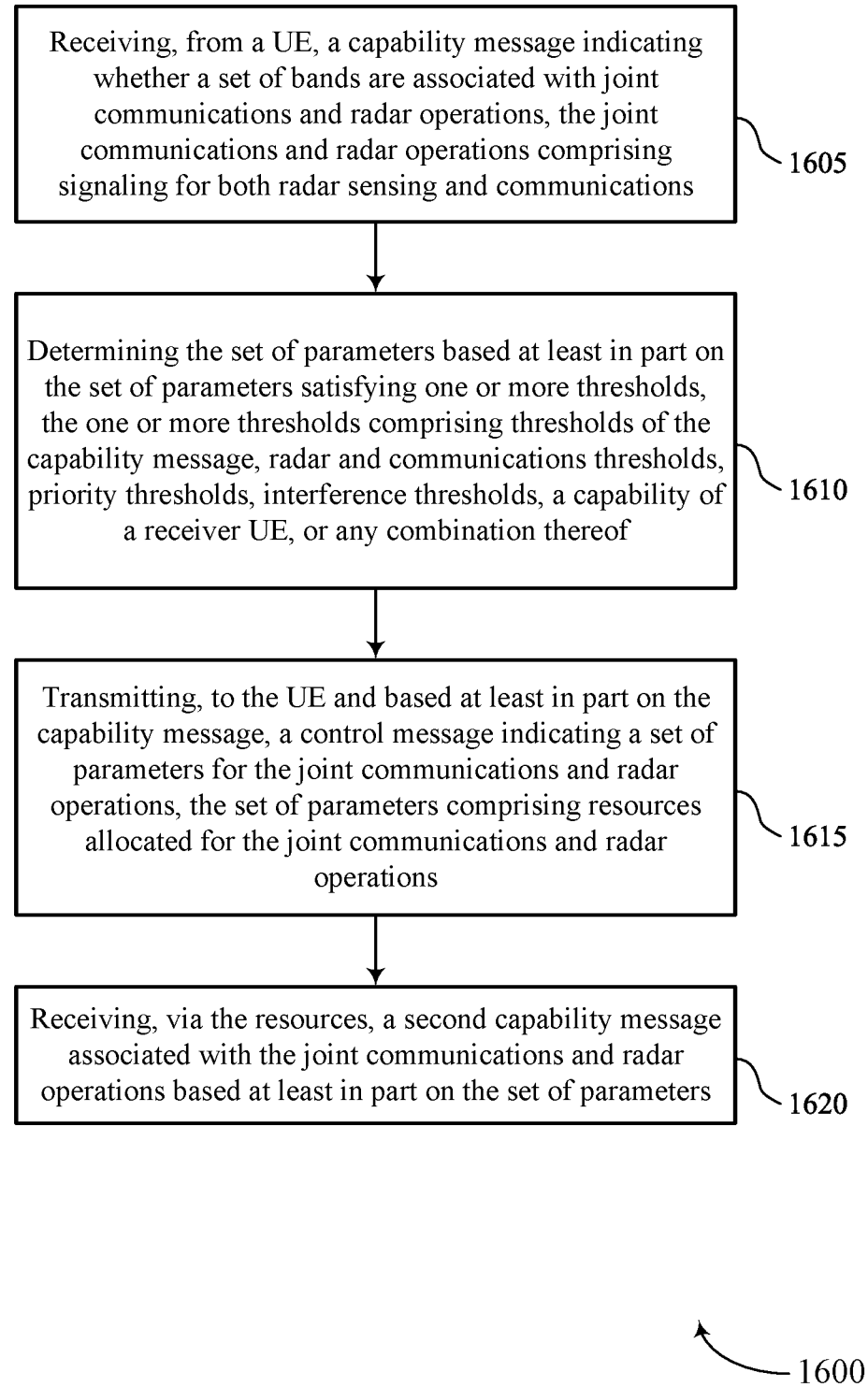

FIG. 16 shows a flowchart illustrating a method 1600 that supports techniques for multi-band joint communications and radar in accordance with various aspects of the present disclosure. The operations of the method 1600 may be implemented by a wireless node or its components as described herein. For example, the operations of the method 1600 may be performed by a wireless node as described with reference to FIGS. 1 through 4 and 9 through 12. In some examples, a wireless node may execute a set of instructions to control the functional elements of the wireless node to perform the described functions. Additionally or alternatively, the wireless node may perform aspects of the described functions using special-purpose hardware.

At 1605, the method may include receiving, from a UE, a capability message indicating whether a set of bands are associated with joint communications and radar operations, the joint communications and radar operations including signaling for both radar sensing and communications. The operations of 1605 may be performed in accordance with examples as disclosed herein. In some examples, aspects of the operations of 1605 may be performed by a capability manager 1125 as described with reference to FIG. 11.

At 1610, the method may include determining the set of parameters based on the set of parameters satisfying one or more thresholds, the one or more thresholds including thresholds of the capability message, radar and communications thresholds, priority thresholds, interference thresholds, a capability of a receiver UE, or any combination thereof. The operations of 1610 may be performed in accordance with examples as disclosed herein. In some examples, aspects of the operations of 1610 may be performed by a parameter manager 1130 as described with reference to FIG. 11.

At 1615, the method may include transmitting, to the UE and based on the capability message, a control message indicating a set of parameters for the joint communications and radar operations, the set of parameters including resources allocated for the joint communications and radar operations. The operations of 1615 may be performed in accordance with examples as disclosed herein. In some examples, aspects of the operations of 1615 may be performed by a parameter manager 1130 as described with reference to FIG. 11.

At 1620, the method may include receiving, via the resources, a second capability message associated with the joint communications and radar operations based on the set of parameters. The operations of 1620 may be performed in accordance with examples as disclosed herein. In some examples, aspects of the operations of 1620 may be performed by a capability manager 1125 as described with reference to FIG. 11. The following provides an overview of aspects of the present disclosure:

Aspect 1: A method for wireless communications at a UE, comprising: transmitting, to a wireless node, a capability message indicating whether a set of bands are associated with joint communications and radar operations, the joint communications and radar operations comprising signaling for both radar sensing and communications; receiving, from the wireless node and based at least in part on the capability message, a control message indicating a set of parameters for the joint communications and radar operations, the set of parameters comprising resources allocated for the joint communications and radar operations; and transmitting, via the resources, a signal for both radar sensing and communications in accordance with the set of parameters.

Aspect 2: The method of aspect 1, wherein transmitting the capability message comprises: transmitting an indication that a first subset of the set of bands supports the joint communications and radar operations, an indication that a second subset of the set of bands fails to support the joint communications and radar operations, or both.

Aspect 3: The method of any of aspects 1 through 2, wherein transmitting the capability message comprises: transmitting an indication of a set of codebook parameters for one or more bands of the set of bands that support the joint communications and radar operations, the set of codebook parameters comprising one or more sub-carrier spacing configurations, beamforming parameters, a radar reference signal configuration, or any combination thereof.

Aspect 4: The method of any of aspects 1 through 3, wherein transmitting the capability message comprises: transmitting a performance report for communications via one or more bands of the set of bands based at least in part on the set of parameters.

Aspect 5: The method of aspect 4, wherein the performance report indicates a throughput, a latency, a signal to noise ratio, a signal to interference ratio, or any combination thereof.

Aspect 6: The method of any of aspects 1 through 5, wherein transmitting the capability message comprises: transmitting a performance report for radar via one or more bands of the set of bands based at least in part on the set of parameters.

Aspect 7: The method of aspect 6, wherein the performance report indicates a threshold range, a threshold velocity, a threshold angular estimate, a target estimation accuracy, an interference metric, or any combination thereof.

Aspect 8: The method of any of aspects 1 through 7, wherein the set of parameters comprises a configuration for waveform beamforming transmissions for the joint communications and radar operations based at least in part on the capability message.

Aspect 9: The method of any of aspects 1 through 8, wherein transmitting the signal for both radar sensing and communications comprises: transmitting a first stage signal for radar sensing, the first stage signal associated with a first set of metrics based at least in part on the set of parameters; and transmitting a second stage signal for the radar sensing, the second stage signal associated with a second set of metrics based at least in part on the set of parameters.

Aspect 10: The method of aspect 9, wherein the first set of metrics comprises a first communications data rate; and the second set of metrics comprises a second communications data rate greater than the first communications data rate.

Aspect 11: The method of any of aspects 1 through 10, wherein receiving the control message comprises: receiving, based at least in part on a radar interference of a first angular sector of a band satisfying a threshold, an indication allocating narrow band communications in a second angular sector of the band, an indication to use a tracking radar mode in the second angular sector of the band, or any combination thereof.

Aspect 12: The method of any of aspects 1 through 11, wherein transmitting the signal for both radar sensing and communications comprises: transmitting, to a second UE, a first signal via a first band based at least in part on a capability of the second UE; and transmitting a second signal via a second band based at least in part on the capability of the second UE.

Aspect 13: The method of aspect 12, wherein the second UE supports the first band for communications, further comprising: transmitting the first signal via the first band with a communications data rate that satisfies a threshold based at least in part the second UE supporting the first band for communications.

Aspect 14: The method of any of aspects 12 through 13, wherein the second band supports radar sensing in a full duplex mode, further comprising: transmitting the first signal for radar sensing via the first band and transmitting the second signal for data communications via the second band based at least in part on the second band supporting radar sensing in a full duplex mode.

Aspect 15: The method of any of aspects 1 through 14, further comprising: transmitting, to the wireless node, a second capability message indicating one or more metrics associated with transmitting the signal for both radar sensing and communications; and receiving, from the wireless node and based at least in part on the second capability message, a second control message indicating a second set of parameters.

Aspect 16: A method for wireless communications at a wireless node, comprising: receiving, from a UE, a capability message indicating whether a set of bands are associated with joint communications and radar operations, the joint communications and radar operations comprising signaling for both radar sensing and communications; transmitting, to the UE and based at least in part on the capability message, a control message indicating a set of parameters for the joint communications and radar operations, the set of parameters comprising resources allocated for the joint communications and radar operations; and receiving, via the resources, a second capability message associated with the joint communications and radar operations based at least in part on the set of parameters.

Aspect 17: The method of aspect 16, wherein receiving the capability message comprises: receiving an indication that a first subset of the set of bands supports the joint communications and radar operations, an indication that a second subset of the set of bands fails to support the joint communications and radar operations, or both.

Aspect 18: The method of any of aspects 16 through 17, wherein receiving the capability message comprises: receiving an indication of a set of codebook parameters for one or more bands of the set of bands that support the joint communications and radar operations, the set of codebook parameters comprising one or more sub-carrier spacing configurations, beamforming parameters, a radar reference signal configuration, or any combination thereof.

Aspect 19: The method of any of aspects 16 through 18, wherein receiving the capability message comprises: receiving a performance report for communications via one or more bands of the set of bands based at least in part on the set of parameters.

Aspect 20: The method of aspect 19, wherein the performance report indicates a throughput, a latency, a signal to noise ratio, a signal to interference ratio, or any combination thereof.

Aspect 21: The method of any of aspects 16 through 20, wherein receiving the capability message comprises: receiving a performance report for radar via one or more bands of the set of bands based at least in part on the set of parameters.

Aspect 22: The method of aspect 21, wherein the performance report indicates a threshold range, a threshold velocity, a threshold angular estimate, a target estimation accuracy, an interference metric, or any combination thereof.

Aspect 23: The method of any of aspects 16 through 22, wherein the set of parameters comprises a configuration for waveform beamforming transmissions for the joint communications and radar operations based at least in part on the capability message.

Aspect 24: The method of any of aspects 16 through 23, further comprising: determining the set of parameters based at least in part on the set of parameters satisfying one or more thresholds, the one or more thresholds comprising thresholds of the capability message, radar and communications thresholds, priority thresholds, interference thresholds, a capability of a receiver UE, or any combination thereof.

Aspect 25: The method of any of aspects 16 through 24, wherein the set of parameters comprises a first set of parameters for a first stage signal and a second set of parameters for a second stage signal.

Aspect 26: The method of any of aspects 16 through 25, wherein transmitting the control message comprises: transmitting, based at least in part on a radar interference of a first angular sector of a band satisfying a threshold, an indication allocating narrow band communications in a second angular sector of the band, an indication to use a tracking radar mode in the second angular sector of the band, or any combination thereof.

Aspect 27: The method of any of aspects 16 through 26, further comprising: transmitting, to the UE and based at least in part on the second capability message, a second control message indicating a second set of parameters.

Aspect 28: An apparatus for wireless communications at a UE, comprising a processor; memory coupled with the processor; and instructions stored in the memory and executable by the processor to cause the apparatus to perform a method of any of aspects 1 through 15.

Aspect 29: An apparatus for wireless communications at a UE, comprising at least one means for performing a method of any of aspects 1 through 15.

Aspect 30: A non-transitory computer-readable medium storing code for wireless communications at a UE, the code comprising instructions executable by a processor to perform a method of any of aspects 1 through 15.

Aspect 31: An apparatus for wireless communications at a wireless node, comprising a processor; memory coupled with the processor; and instructions stored in the memory and executable by the processor to cause the apparatus to perform a method of any of aspects 16 through 27.

Aspect 32: An apparatus for wireless communications at a wireless node, comprising at least one means for performing a method of any of aspects 16 through 27.

Aspect 33: A non-transitory computer-readable medium storing code for wireless communications at a wireless node, the code comprising instructions executable by a processor to perform a method of any of aspects 16 through 27.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
    transmitting, to a wireless node, a capability message indicating whether a set of bands are associated with joint communications and radar operations, the joint communications and radar operations including signaling for both radar sensing and communications;
    receiving, from the wireless node and based at least in part on the capability message, a control message indicating a set of parameters for the joint communications and radar operations, the set of parameters including resources allocated for the joint communications and radar operations; and
    transmitting, via the resources, a signal for both radar sensing and communications in accordance with the set of parameters.

2. The method of claim 1, wherein transmitting the capability message comprises:
    transmitting an indication that a first subset of the set of bands supports the joint communications and radar operations, an indication that a second subset of the set of bands fails to support the joint communications and radar operations, or both.

3. The method of claim 1, wherein transmitting the capability message comprises:
    transmitting an indication of a set of codebook parameters for one or more bands of the set of bands that support the joint communications and radar operations, the set of codebook parameters including one or more subcarrier spacing configurations, beamforming parameters, a radar reference signal configuration, or any combination thereof.

4. The method of claim 1, wherein transmitting the capability message comprises:
    transmitting a performance report for communications via one or more bands of the set of bands based at least in part on the set of parameters.

5. The method of claim 4, wherein the performance report indicates a throughput, a latency, a signal to noise ratio, a signal to interference ratio, or any combination thereof.

6. The method of claim 1, wherein transmitting the capability message comprises:
    transmitting a performance report for radar via one or more bands of the set of bands based at least in part on the set of parameters.

7. The method of claim 6, wherein the performance report indicates a threshold range, a threshold velocity, a threshold angular estimate, a target estimation accuracy, an interference metric, or any combination thereof.

8. The method of claim 1, wherein the set of parameters includes a configuration for waveform beamforming transmissions for the joint communications and radar operations based at least in part on the capability message.

9. The method of claim 1, wherein transmitting the signal for both radar sensing and communications comprises:
    transmitting a first stage signal for radar sensing, the first stage signal associated with a first set of metrics based at least in part on the set of parameters; and
    transmitting a second stage signal for the radar sensing, the second stage signal associated with a second set of metrics based at least in part on the set of parameters.

10. The method of claim 9, wherein:
    the first set of metrics includes a first communications data rate; and
    the second set of metrics includes a second communications data rate greater than the first communications data rate.

11. The method of claim 1, wherein receiving the control message comprises:
    receiving, based at least in part on a radar interference of a first angular sector of a band satisfying a threshold, an indication allocating narrow band communications in a second angular sector of the band, an indication to use a tracking radar mode in the second angular sector of the band, or any combination thereof.

12. The method of claim 1, wherein transmitting the signal for both radar sensing and communications comprises:
    transmitting, to a second UE, a first signal via a first band based at least in part on a capability of the second UE; and
    transmitting a second signal via a second band based at least in part on the capability of the second UE.

13. The method of claim 12, wherein the second UE supports the first band for communications, further comprising:
transmitting the first signal via the first band with a communications data rate that satisfies a threshold based at least in part the second UE supporting the first band for communications.

14. The method of claim 12, wherein the second band supports radar sensing in a full duplex mode, further comprising:
transmitting the first signal for radar sensing via the first band and transmitting the second signal for data communications via the second band based at least in part on the second band supporting radar sensing in a full duplex mode.

15. The method of claim 1, further comprising:
transmitting, to the wireless node, a second capability message indicating one or more metrics associated with transmitting the signal for both radar sensing and communications; and
receiving, from the wireless node and based at least in part on the second capability message, a second control message indicating a second set of parameters.

16. A method for wireless communications at a wireless node, comprising:
receiving, from a user equipment (UE), a capability message indicating whether a set of bands are associated with joint communications and radar operations, the joint communications and radar operations including signaling for both radar sensing and communications;
transmitting, to the UE and based at least in part on the capability message, a control message indicating a set of parameters for the joint communications and radar operations, the set of parameters including resources allocated for the joint communications and radar operations; and
receiving, via the resources, a second capability message associated with the joint communications and radar operations based at least in part on the set of parameters.

17. The method of claim 16, wherein receiving the capability message comprises:
receiving an indication that a first subset of the set of bands supports the joint communications and radar operations, an indication that a second subset of the set of bands fails to support the joint communications and radar operations, or both.

18. The method of claim 16, wherein receiving the capability message comprises:
receiving an indication of a set of codebook parameters for one or more bands of the set of bands that support the joint communications and radar operations, the set of codebook parameters including one or more subcarrier spacing configurations, beamforming parameters, a radar reference signal configuration, or any combination thereof.

19. The method of claim 16, wherein receiving the capability message comprises:
receiving a performance report for communications via one or more bands of the set of bands based at least in part on the set of parameters.

20. The method of claim 19, wherein the performance report indicates a throughput, a latency, a signal to noise ratio, a signal to interference ratio, or any combination thereof.

21. The method of claim 16, wherein receiving the capability message comprises:
receiving a performance report for radar via one or more bands of the set of bands based at least in part on the set of parameters.

22. The method of claim 21, wherein the performance report indicates a threshold range, a threshold velocity, a threshold angular estimate, a target estimation accuracy, an interference metric, or any combination thereof.

23. The method of claim 16, wherein the set of parameters comprises a configuration for waveform beamforming transmissions for the joint communications and radar operations based at least in part on the capability message.

24. The method of claim 16, further comprising:
determining the set of parameters based at least in part on the set of parameters satisfying one or more thresholds, the one or more thresholds including thresholds of the capability message, radar and communications thresholds, priority thresholds, interference thresholds, a capability of a receiver UE, or any combination thereof.

25. The method of claim 16, wherein the set of parameters includes a first set of parameters for a first stage signal and a second set of parameters for a second stage signal.

26. The method of claim 16, wherein transmitting the control message comprises:
transmitting, based at least in part on a radar interference of a first angular sector of a band satisfying a threshold, an indication allocating narrow band communications in a second angular sector of the band, an indication to use a tracking radar mode in the second angular sector of the band, or any combination thereof.

27. The method of claim 16, further comprising:
transmitting, to the UE and based at least in part on the second capability message, a second control message indicating a second set of parameters.

28. An apparatus for wireless communication at a first user equipment (UE), comprising:
a processor,
memory coupled with the processor; and
instructions stored in the memory and executable by the processor to cause the apparatus to:
transmit, to a wireless node, a capability message indicating whether a set of bands are associated with joint communications and radar operations, the joint communications and radar operations including signaling for both radar sensing and communications;
receive, from the wireless node and based at least in part on the capability message, a control message indicating a set of parameters for the joint communications and radar operations, the set of parameters including resources allocated for the joint communications and radar operations; and
transmit, via the resources, a signal for both radar sensing and communications in accordance with the set of parameters.

29. The apparatus of claim 28, wherein the instructions to transmit the capability message are further executable by the processor to cause the apparatus to:
transmit an indication that a first subset of the set of bands supports the joint communications and radar operations, an indication that a second subset of the set of bands fails to support the joint communications and radar operations, or both.

30. An apparatus for wireless communication at a first user equipment (UE), comprising:
a processor,
memory coupled with the processor; and instructions stored in the memory and executable by the processor to cause the apparatus to:
- receive, from a user equipment (UE), a capability message indicating whether a set of bands are associated with joint communications and radar operations, the joint communications and radar operations including signaling for both radar sensing and communications;
- transmit, to the UE and based at least in part on the capability message, a control message indicating a set of parameters for the joint communications and radar operations, the set of parameters including resources allocated for the joint communications and radar operations; and
- receive, via the resources, a second capability message associated with the joint communications and radar operations based at least in part on the set of parameters.

* * * * *